United States Patent [19]
Ji et al.

[11] Patent Number: 5,889,943
[45] Date of Patent: Mar. 30, 1999

[54] APPARATUS AND METHOD FOR ELECTRONIC MAIL VIRUS DETECTION AND ELIMINATION

[75] Inventors: Shuang Ji, Foster City; Eva Chen; Yung-Chang Liang, both of Cupertino, all of Calif.; Warren Tsai, Taipei, Taiwan

[73] Assignee: Trend Micro Incorporated, Taiwan

[21] Appl. No.: 625,800

[22] Filed: Mar. 29, 1996

Related U.S. Application Data

[63] Continuation-in-part of Ser. No. 533,706, Sep. 26, 1995, Pat. No. 5,623,600.

[51] Int. Cl.$^6$ ............... G06F 13/00; G07D 7/00; H04L 9/00
[52] U.S. Cl. ............... 395/187.01; 364/286.4; 395/200.06; 340/825.34; 380/49
[58] Field of Search ............... 395/183.14, 183.17, 395/183.18, 186, 187.01, 200.06; 380/4, 49; 364/269.4, 285.4, 286.4, 222.5; 340/825.34

[56] References Cited

U.S. PATENT DOCUMENTS

| | | | |
|---|---|---|---|
| 4,975,950 | 12/1990 | Lentz | 380/4 |
| 5,278,901 | 1/1994 | Shieh et al. | 380/4 |
| 5,319,776 | 6/1994 | Hile et al. | 395/575 |
| 5,321,840 | 6/1994 | Ahlin et al. | 395/700 |
| 5,414,833 | 5/1995 | Hershey et al. | 395/575 |
| 5,428,795 | 6/1995 | Johnson et al. | 395/725 |
| 5,440,723 | 8/1995 | Arnold et al. | 395/181 |
| 5,444,850 | 8/1995 | Chang | 395/200 |
| 5,448,668 | 9/1995 | Perelson et al. | 395/182 |
| 5,452,442 | 9/1995 | Kephart | 395/183 |
| 5,485,575 | 1/1996 | Chess et al. | 395/183 |
| 5,491,791 | 2/1996 | Glowny et al. | 395/183 |
| 5,511,163 | 4/1996 | Lerche et al. | 398/183 |
| 5,530,757 | 6/1996 | Krawczyk | 380/23 |
| 5,550,976 | 8/1996 | Henderson et al. | 395/200.06 |
| 5,550,984 | 8/1996 | Gelb | 395/200.17 |
| 5,623,600 | 4/1997 | Ji et al. | 395/187.01 |

FOREIGN PATENT DOCUMENTS

| | | | |
|---|---|---|---|
| 6350784 | 6/1994 | Japan | H04N 1/00 |
| 9322723 | 11/1993 | WIPO | G06F 11/00 |

OTHER PUBLICATIONS

Omura, Jim K., Novel Applications of Cryptography in digital Comms., IEEE, pp. 21–28, May 1990.
"Tenfour Announces TFS Gateway Release 3—The Next Generation of E–mail gateways;"Presswire (entire document.), Jun. 12, 1997.
"First E–mail Virus Protection for HP–UX", Internet Content Report, vol. 1, No. 18, Comm Industry Researchers (entire document), 15 Dec. 1996.

*Primary Examiner*—Robert W. Beausoliel, Jr.
*Assistant Examiner*—Norman Wright
*Attorney, Agent, or Firm*—Skjerven, Morrill, MacPherson, Franklin & Friel; Norman R. Klivans

[57] ABSTRACT

The detection and elimination of viruses on a computer network is disclosed. An apparatus for detecting and eliminating viruses which may be introduced by messages sent through a postal node of a network electronic mail system includes polling and retrieval modules in communication with the postal node to determine the presence of unscanned messages and to download data associated with them to a node for treatment by a virus analysis and treatment module. A method for detecting and eliminating viruses introduced by an electronic mail system includes polling the postal node for unscanned messages, downloading the messages into a memory of a node, and performing virus detection and analysis at the node.

42 Claims, 19 Drawing Sheets

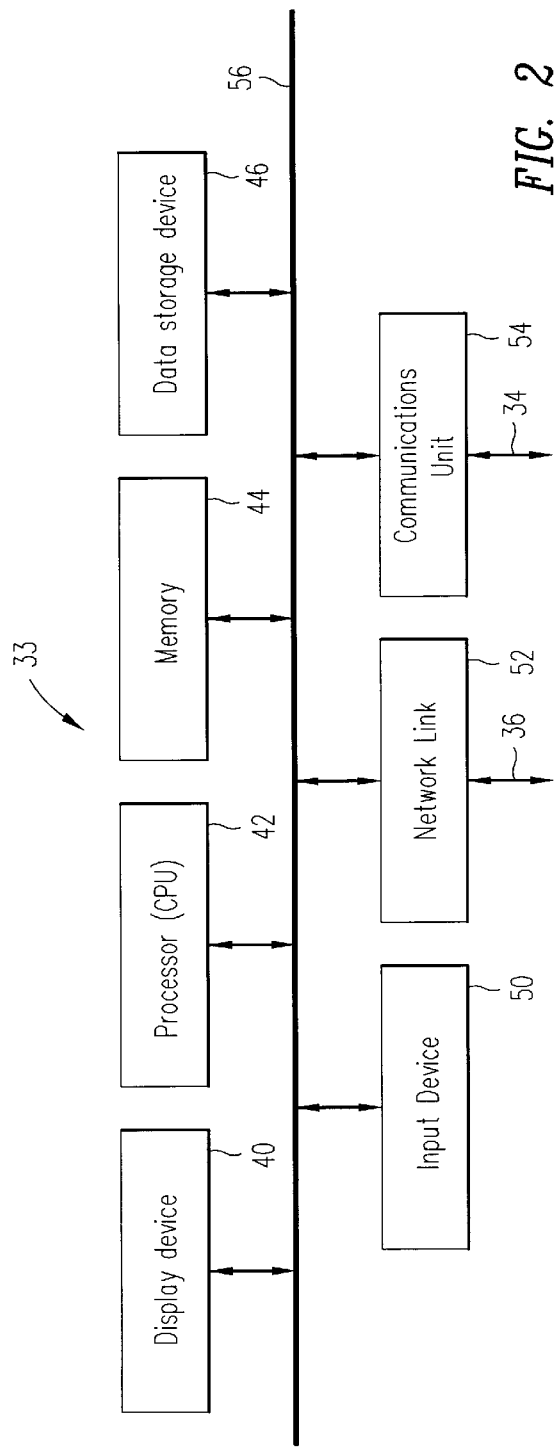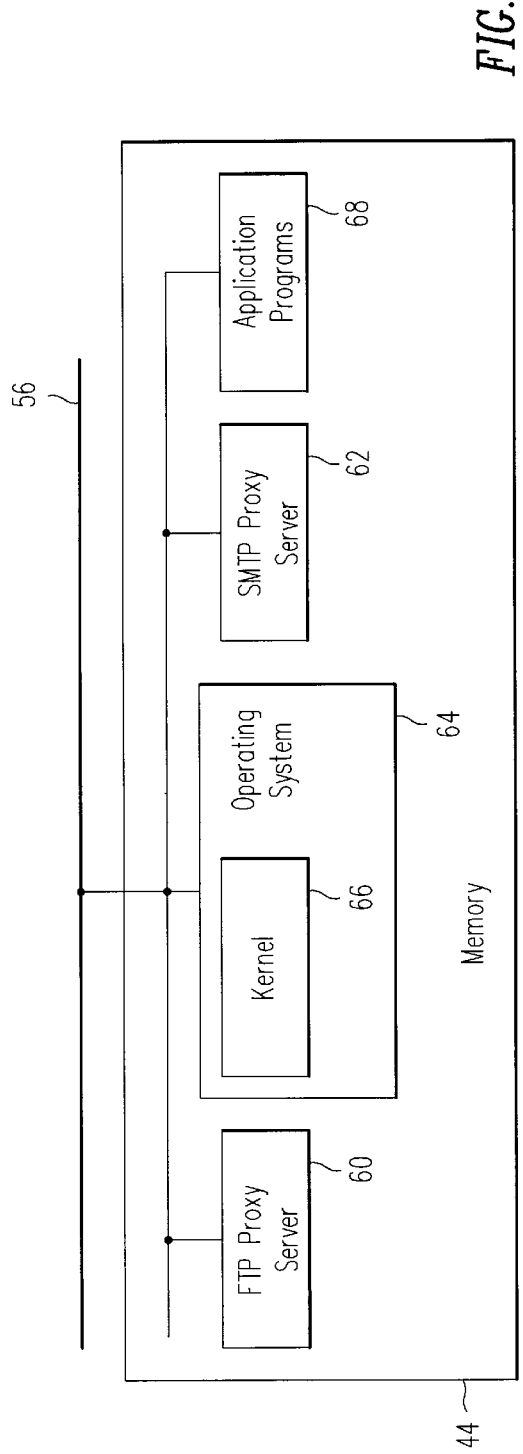

FIG. 4

| OSI Layer | Protocol Implementation | | | |
|---|---|---|---|---|
| Application 406 | File Transfer 423 | Electronic Mail 424 | Terminal Emulation 425 | Network Management 426 |
| Presentation 405 | FTP Proxy Server 421 | SMTP Proxy Server 422 | | |
| Session 404 | File Transfer Protocol (FTP) 417 | Simple Mail Transfer Protocol (SMTP) 418 | TELNET Protocol 419 | Simple Network Management Protocol (SNMP) 420 |
| Transport 403 | Transmission Control Protocol (TCP) 415 | | | User Datagram Protocol (UDP) 416 |
| Network 402 | Address Resolution 412 | Internet Protocol (IP) 413 | | Internet Control Message Protocol 414 |
| Data Link 401 | Network Interface Cards: Ethernet, StarLAN token Ring 411 | | | |
| Physical 400 | Transmission media: twisted pair, coax or fiber optics 410 | | | |

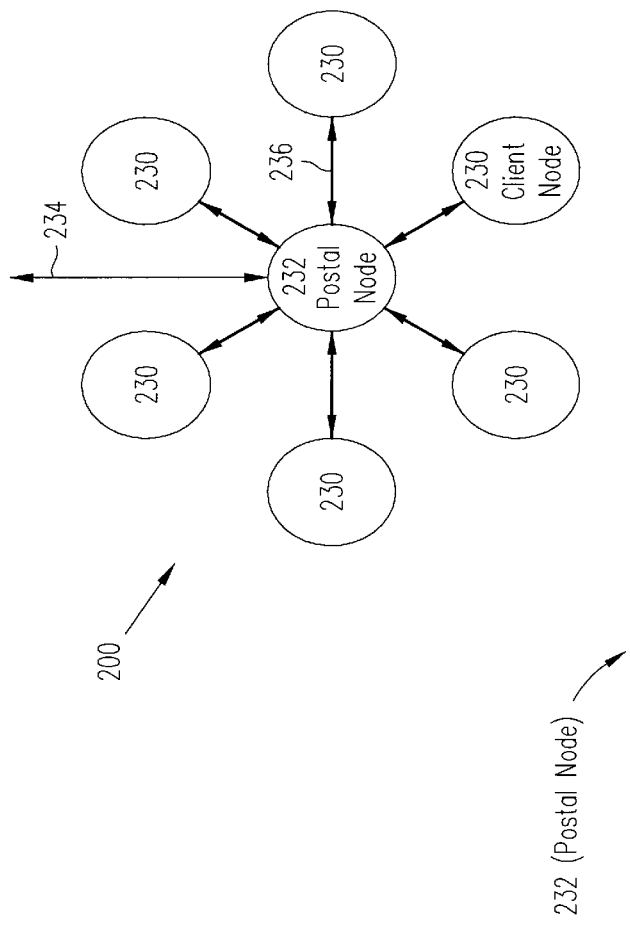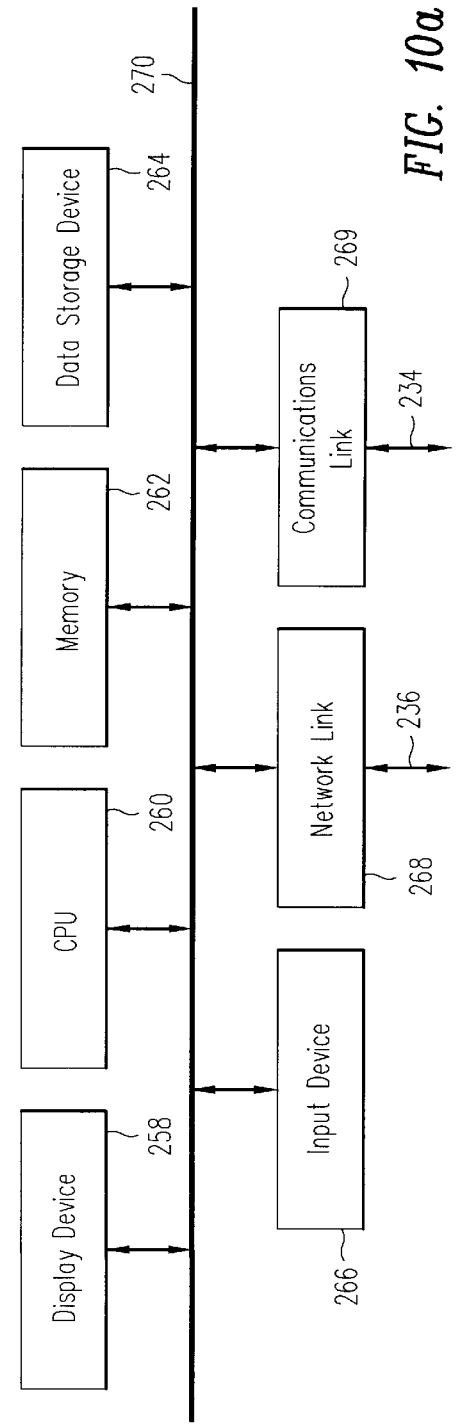

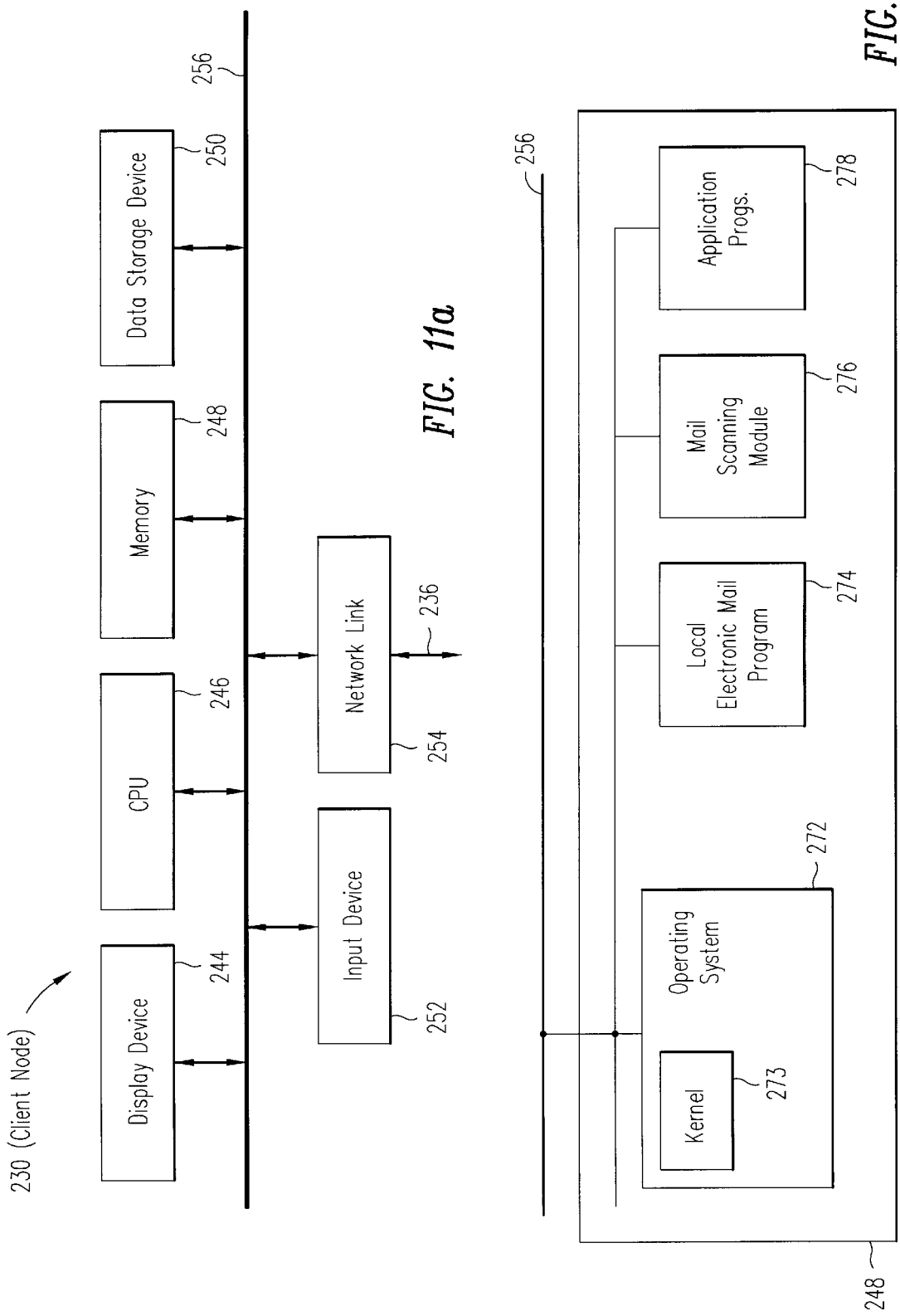

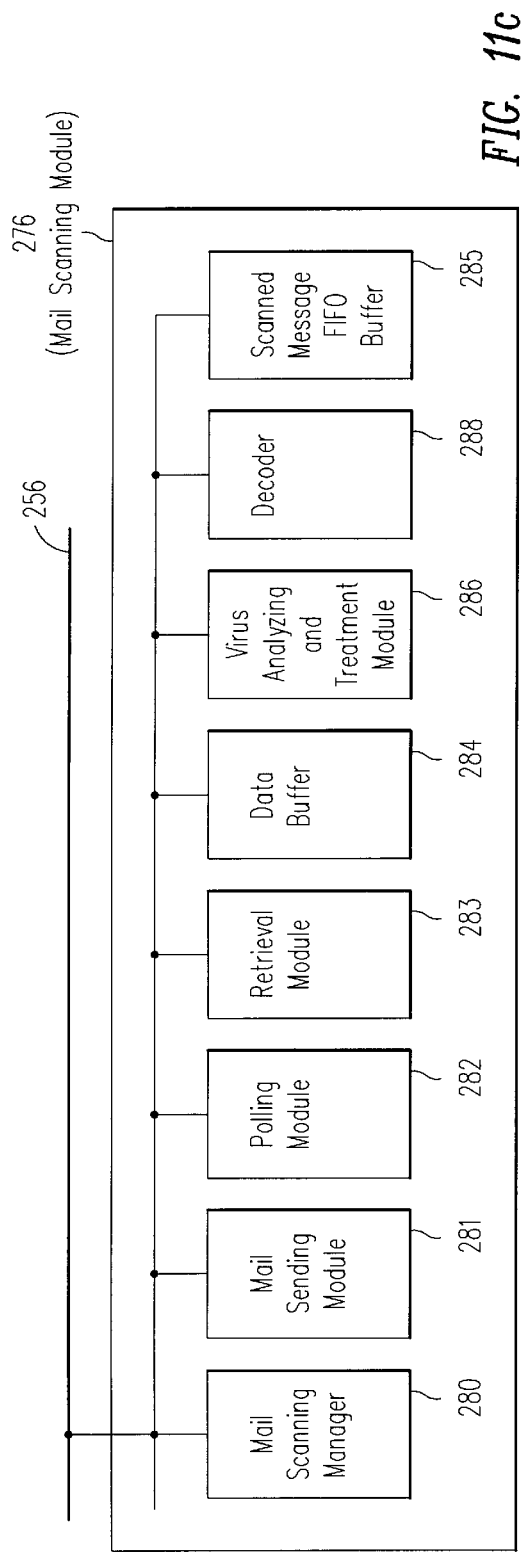

APPARATUS AND METHOD FOR ELECTRONIC MAIL VIRUS DETECTION AND ELIMINATION

This application is a continuation-in-part of application Ser. No. 08/533,706, filed Sep. 26, 1995, now U.S. Pat. No. 5,623,600.

BACKGROUND OF THE INVENTION

1. Field of the Invention

The present invention relates generally to computer systems and computer networks. In particular, the present invention relates to a system and method for detecting and removing computer viruses. Still more particularly, the present invention relates to a system and method for detecting and removing computer viruses from file and message transfers between computer networks and to an apparatus and method for detecting and removing computer viruses from files and messages accessed by electronic mail through a network postal node.

2. Description of the Related Art

During the recent past, the use of computers has become widespread. Moreover, the interconnection of computers into networks has also become prevalent. Referring now to FIG. 1, a block diagram of a portion of a prior art information system 20 is shown. The portion of the information system 20 shown comprises a first network 22, a second network 24 and third network 26. This information system 20 is provided only by way of example, and those skilled in the art will realize that the information system 20 may include any number of networks, each of the networks being its own protected domain and having any number of nodes. As shown in FIG. 1, each of the networks 22, 24, 26 is formed from a plurality of nodes 30, 32. Each of the nodes 30, 32 is preferably a microcomputer. The nodes 30, 32 are coupled together to form a network by a plurality of network connections 36. For example, the nodes 30, 32 may be connected together using a token ring format, ethernet format or any of the various other formats known in the art. Each of the networks 22, 24, 26 includes a node 32 that acts as a gateway to link the respective network 22, 24, 26 to other networks 22, 24, 26. Each of the gateway nodes 32 is preferably coupled by a standard telephone line connection 34 such as POTS (Plain Old Telephone Service) or a T-1 link to the other gateway nodes 32 through a telephone switching network 28. All communication between the networks 22, 24, 26 is preferably performed through one of the gateway nodes 32.

Also of increasing prevalence is the use of electronic mail to access information. Referring now to FIG. 9, an electronic mail system 200 is shown to include a plurality of client nodes 230, which preferably are microcomputers, connected to a postal node 232 arranged to facilitate electronic mail accesses such as those between the client nodes 230. The postal node may also include a communications link 234 to another network or may communicate with additional postal nodes (not shown). Electronic mail may be accessed from the postal node 232 to single or multiple users, and may include simple messages or complex information including files with viruses.

One particular problem that has plagued computers, in particular microcomputers, have been computer viruses and worms. A computer virus is a section of code that is buried or hidden in another program. Once the program is executed, the code is activated and attaches itself to other programs in the system. Infected programs in turn copy the code to other programs. The effect of such viruses can be simple pranks that cause a message to be displayed on the screen or more serious effects such as the destruction of programs and data. Another problem in the prior art is worms. Worms are destructive programs that replicate themselves throughout disk and memory using up all available computer resources eventually causing the computer system to crash. Obviously, because of the destructive nature of worms and viruses, there is a need for eliminating them from computers and networks.

The prior art has attempted to reduce the effects of viruses and prevent their proliferation by using various virus detection programs. One such virus detection method, commonly referred to as behavior interception, monitors the computer or system for important operating system functions such as write, erase, format disk, etc. When such operations occur, the program prompts the user for input as to whether such an operation is expected. If such an operation is not expected (e.g., the user was not operating any program that employed such a function), the user can abort the operation knowing it was being prompted by a virus program. Another virus detection method, known as signature scanning, scans program code that is being copied onto the system. The system searches for known patterns of program code used for viruses. Currently, signature scanning only operates on the floppy disk drives, hard drives or optical drives. Yet another prior art approach to virus detection performs a checksum on all host programs stored on a system and known to be free from viruses. Thus, if a virus later attaches itself to a host program, the checksum value will be different and the presence of a virus can be detected.

Nonetheless, these approaches of the prior art suffer from a number of shortcomings. First, behavior interception is not successful at detecting all viruses because critical operations that may be part of the code for a virus can be placed at locations where such critical operations are likely to occur for the normal operation of programs. Second, most signature scanning is only performed on new inputs from disk drives. With the advent of the Internet and its increased popularity, there are no prior art methods that have been able to successfully scan connections 36 such as those utilized by a gateway node in communicating with other networks. Third, many of the above methods require a significant amount of computing resources, which in turn degrades the overall performance of system. Thus, operating the virus detection programs on every computer becomes impractical. Therefore, the operation of many such virus detection programs is disabled for improved performance of individual machines.

Therefore, there is a need for a system and method for effectively detecting and eliminating viruses without significantly effecting the performance of the computer. Moreover, there is a need for a system and method that can detect and eliminate viruses in networks attached to other information systems by way of gateways or the Internet.

Another problem of increasing significance is the spread of computer viruses through electronic mail communications, including intra-network electronic mail accesses which do not need to pass through a network gateway node 33. The referenced prior art shortcomings are also present in the detection and prevention of the spread of viruses through electronic mail. Additionally problematic are electronic mail access by multiple users which may exponentially increase the potential for the spread of viruses, the detection of viruses on encoded or encrypted files, the tendency of computer users not to undertake virus detection and user impatience during virus detection intervals.

Therefore, there is also a need for an apparatus and method for detecting viruses which may be spread through electronic mail communications. Moreover, there is a need for such an apparatus and method which can prevent multiplied virus spreading, facilitate encoded file virus detection, trigger without requiring user intervention and operate in the background.

SUMMARY OF THE INVENTION

The present invention overcomes the limitations and shortcomings of the prior art with systems, apparatuses and methods for detecting and eliminating viruses on a computer network.

A system including the present invention is a network formed of a plurality of nodes and a gateway node for connection to other networks. The nodes are preferably microcomputers, and the gateway node comprises: a display device, a central processing unit, a memory forming the apparatus of the present invention, an input device, a network link and a communications unit. The memory further comprises an operating system including a kernel, a File Transfer Protocol (FTP) proxy server, and a Simple Mail Transfer Protocol (SMTP) proxy server. The central processing unit, display device, input device, and memory are coupled and operate to execute the application programs stored in the memory. The central processing unit of the gateway node also executes the FTP proxy server for transmitting and receiving files over the communications unit, and executes the SMTP proxy server for transmitting and receiving messages over the communications unit. The FTP proxy server and SMTP proxy server are preferably executed concurrently with the normal operation of the gateway node. The servers advantageously operate in a manner such that viruses transmitted to or from the network in messages and files are detected before the files are transferred into or from the network. The gateway node of the present invention is particularly advantageous because the impact of using the FTP proxy server and SMTP proxy server for the detection of viruses is minimized because only the files leaving or entering the network are evaluated for the presence of viruses and all other "intra"-network traffic is unaffected.

The present invention also comprises a method for processing a file before transmission into the network and a method for processing a file before transmission from the network. The preferred method for processing a file comprises the steps of: receiving the data transfer command and file name; transferring the file to the proxy server; performing virus detection on the file; determining whether the file contains any viruses; transferring the file from the proxy server to a recipient node if the file does not contain a virus; and performing a preset action with the file if it does contain a virus. The present invention also includes methods for processing messages before transmission to or from the network that operate in a similar manner.

The present invention also comprises an apparatus for detecting and eliminating viruses which may spread throughout a network in messages accessed with an electronic mail system. In such mail systems, messages directed to a user at a client node are typically stored a postal node prior to their access by the client node. Viruses are detected and corrective action taken by a mail scanning apparatus which preferably resides at the client node. The mail scanning apparatus preferably includes: a polling module for determining the presence of unread messages at the postal node, a retrieval module for downloading unread messages to the memory of a client node and a virus analysis and treatment module for determining whether the message contains a virus and for facilitating corrective action to prevent its spread. Preferably, these modules are arranged to operate without requiring action by any electronic mail program files local to the client node to accommodate unobtrusive virus detection in the background and operation without user initiation or triggering. Additionally, the preferable location of the mail scanning apparatus at the client node accommodates virus detection without consuming postal node resources.

The present invention also comprises a method for detecting and eliminating viruses which may spread throughout a network in messages accessed by an electronic mail system. Preferably, the postal node is polled from the client node for unread messages, unread messages are downloaded into the memory of a client node, the messages are scanned for the presence of viruses, and corrective action taken.

BRIEF DESCRIPTION OF THE DRAWINGS

FIG. 2 is a block diagram of a preferred embodiment for a gateway node including the apparatus of the present invention;

FIG. 3 is a block diagram of a preferred embodiment for a memory of the gateway node including the apparatus of the present invention;

FIG. 4 is a block diagram of a preferred embodiment for a protocol layer hierarchy constructed according to the present invention compared to the OSI layer model of the prior art;

FIG. 9 is a block diagram of a prior art network electronic mail system.

FIG. 10$b$ is a block diagram of a memory of the postal node constructed according to the present invention;

FIG. 10$c$ is a block diagram of a data storage device of the postal node constructed according to the present invention;

FIG. 11$a$ is a block diagram of a preferred embodiment for a client node including the present invention;

FIG. 11$b$ is a block diagram of a preferred embodiment for the memory of the client node according to the present invention;

FIG. 11$c$ is a block diagram of a preferred embodiment for the mail scanning module of the present invention;

FIG. 11$d$ is a graphical representation of a preferred format for storing data in the data buffer;

DETAILED DESCRIPTION OF THE PREFERRED EMBODIMENT

Figure 1:
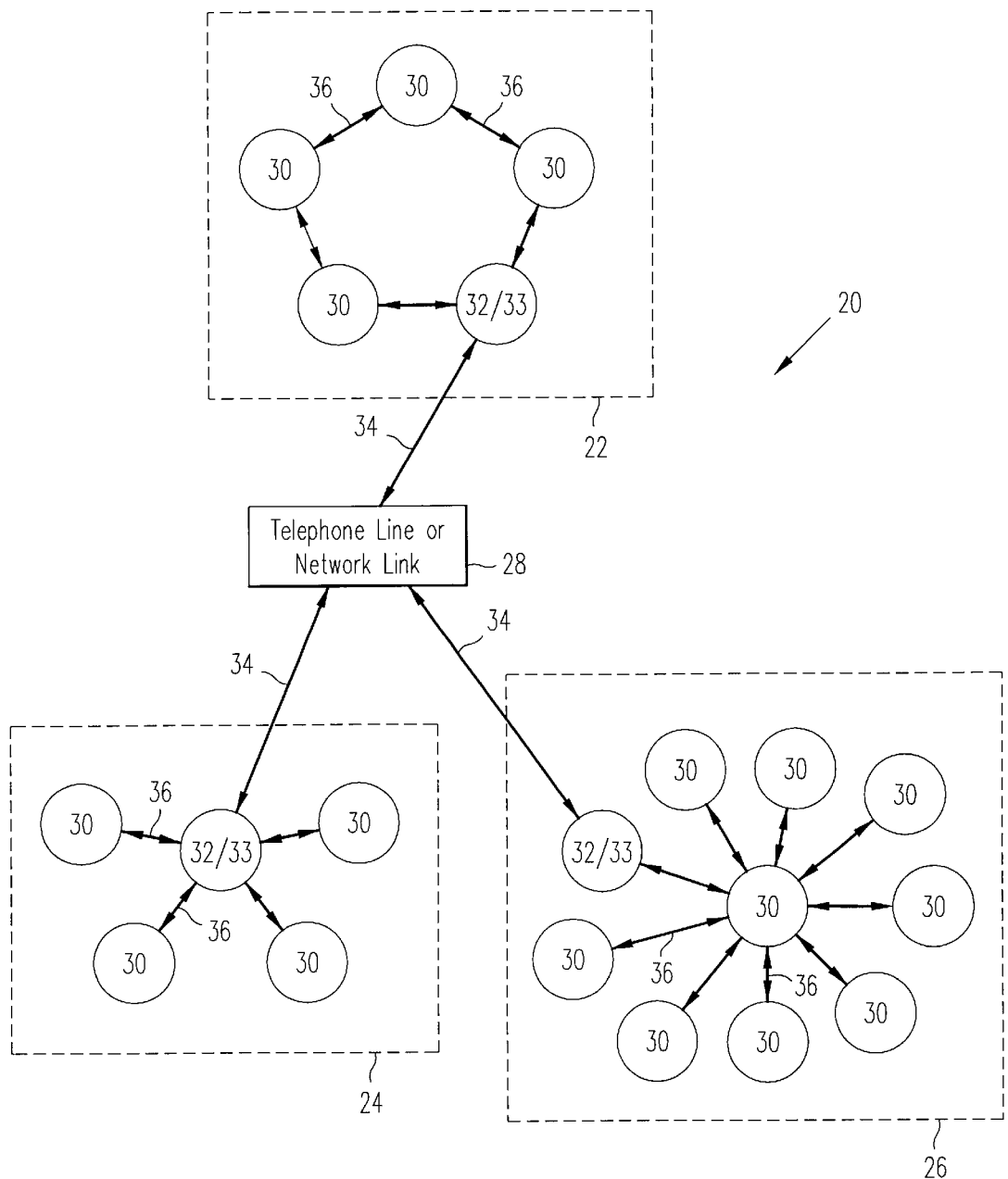
FIG. 1 is a block diagram of a prior art information system with a plurality of networks and a plurality of nodes upon which the present invention operates.

The virus detection system and method of the present invention preferably operates on an information system 20 as has been described above with reference to FIG. 1. The present invention, like the prior art, preferably includes a plurality of node systems 30 and at least one gateway node 33 for each network 22, 24, 26. However, the present invention is different from the prior art because it provides novel gateway node 33 that also performs virus detection for all files being transmitted into or out of a network. Furthermore, the novel gateway node 33 also performs virus detection on all messages being transmitted into or out of an associated network.

Referring now to FIG. 2, a block diagram of a preferred embodiment of the novel gateway node 33 constructed in accordance with the present invention is shown. A preferred embodiment of the gateway node 33 comprises a display device 40, a central processing unit (CPU) 42, a memory 44, a data storage device 46, an input device 50, a network link 52, and a communications unit 54. The CPU 42 is connected by a bus 56 to the display device 40, the memory 44, the data storage device 46, the input device 50, the network link 52, and the communications unit 54 in a von Neumann architecture. The CPU 42, display device 40, input device 50, and memory 44 may be coupled in a conventional manner such as a personal computer. The CPU 42 is preferably a microprocessor such as an Motorola 68040 or Intel Pentium or X86 type processor; the display device 40 is preferably a video monitor; and the input device 50 is preferably a keyboard and mouse type controller. The CPU 42 is also coupled to the data storage device 44 such as a hard disk drive in a conventional manner. Those skilled in the art will realize that the gateway node 33 may also be a minicomputer or a mainframe computer.

The bus 56 is also coupled to the network link 52 to facilitate communication between the gateway node 33 and the other nodes 30 of the network. In the preferred embodiment of the present invention, the network link 52 is preferably a network adapter card including a transceiver that is coupled to a cable or line 36. For example, the network link 52 may be an ethernet card connected to a coaxial line, a twisted pair line or a fiber optic line. Those skilled in the art will realize that a variety of different networking configurations and operating systems including token ring, ethernet, or arcnet may be used and that the present invention is independent of such use. The network link 52 is responsible for sending, receiving, and storing the signals sent over the network or within the protected domain of a given network. The network link 52 is coupled to the bus 56 to provide these signals to the CPU 34 and vice versa.

The bus 56 is also coupled to the communications unit 54 to facilitate communication between the gateway node 33 and the other networks. Specifically, the communications unit 54 is coupled to the CPU 42 for sending data and message to other networks. For example, the communications unit 54 may be a modem, a bridge or a router coupled to the other networks in a conventional manner. In the preferred embodiment of the present invention, the communications unit 54 is preferably a router. The communications unit 54 is in turn coupled to other networks via a media 34 such as a dedicated T-1 phone line, fiber optics, or any one of a number of conventional connecting methods.

The CPU 42, under the guidance and control of instructions received from the memory 44 and from the user through the input device 50, provides signals for sending and receiving data using the communications unit 54. The transfer of data between networks is broken down into the sending and receiving files and messages which in turn are broken down into packets. The methods of the present invention employ a virus detection scheme that is applied to all transfers of messages and files into or out of a network via its gateway node 33.

Referring now to FIG. 3, the preferred embodiment of the memory 44 for the gateway node 33 is shown in more detail. The memory 44 is preferably a random access memory (RAM), but may also include read-only memory (ROM). The memory 44 preferably comprises a File Transfer Protocol (FTP) proxy server 60, a Simple Mail Transfer Protocol (SMTP) proxy server 62, and an operating system 64 including a kernel 66. The routines of the present invention for detecting viruses in file transfers and messages primarily include the FTP proxy server 60 and the SMTP proxy server 62. The FTP proxy server 60 is a routine for controlling file transfers to and from the gateway node 33 via the communications unit 54, and thus controlling file transfers to and from a given network of which the gateway node is a part. The operation of the FTP proxy server 60 is described below in more detail with reference to FIGS. 5A, 5B, 6A, 6B and 6C. Similarly, the SMTP proxy server 62 is a routine for controlling the transfer of messages to and from the gateway node 33, and thus to and from the respective network associated with the gateway node 33. The operation of the SMTP proxy server 62 is described below in more detail with reference to FIGS. 7 8A and 8B. The present invention preferably uses a conventional operating system 28 such as Berkeley Software Distribution UNIX. Those skilled in the art will realize how the present invention may be readily adapted for use with other operating systems such as Macintosh System Software version 7.1, DOS, Windows or Windows NT. The memory 44 may also include a variety of different application programs 68 including but not limited to computer drawing programs, word processing programs, and spreadsheet programs. The present invention is particularly advantageous over the prior because it minimizes the impact of virus detection and elimination since the FTP proxy server 60 and SMTP proxy server 62 are preferably only included or installed in the memory 44 of the gateway nodes 33. Thus, all data being transferred inside the protected domain of a given network will not be checked because the data packets might not be routed via the gateway node 33.

While the apparatus of the present invention, in particular the FTP proxy server 60 and SMTP proxy server 62, has been described above as being located and preferably is located on the gateway node 33, those skilled in the art will realize that the apparatus of the present invention could also be included on a FTP server or a world wide web server for scanning files and messages as they are downloaded from the web. Furthermore, in an alternate embodiment, the apparatus of the present invention may be included in each node of a network for performing virus detection on all messages received or transmitted from that node.

As best shown in FIG. 4, the CPU 42 also utilizes a protocol layer hierarchy to communicate over the network. The protocol layers of the hierarchy of the present invention are shown in FIG. 4 in comparison to the ISO-OSI reference model, for example. The protocol layers 410–426 of the hierarchy of the present invention are similar to the prior art protocol layers for the lower four layers 400–403 including: (1) a physical layer 400 formed of the transmission media 410; (2) a data link layer 401 formed of the network interface cards 411; (3) a network layer 402 formed of address resolution 412, Internet protocol 413 and Internet control message protocol 414; and (4) a transport layer 403 formed of the transmission control protocol 415 and a user datagram protocol 416. Corresponding to the presentation 405 and session 404 layers, the protocol hierarchy of the present invention provides four methods of communication: a file transfer protocol 417, a simple mail transfer protocol 419, a TELNET protocol 419 and a simple network management protocol 420. There are corresponding components on the application layer 406 to handle file transfer 423, electronic mail 424, terminal emulation 425, and network management 426. The present invention advantageously detects, controls and eliminates viruses by providing an additional layer between the application layer 406 and the presentation layer 405 for the gateway nodes 33. In particular, according to the hierarchy of the present invention, a FTP proxy server layer 421 and a SMTP proxy server layer 422 are provided. These layers 421, 422 operate in conjunction with the file transfer layer 423 and file transfer protocol 417, and the electronic mail layer 424 and the SMTP protocol layer 418, to process file transfers and messages, respectively. For example, any file transfer requests are generated by the file transfer application 423, first processed by the FTP proxy server layer 421, then processed by the file transfer protocol 417 and other lower layers 415, 413, 411 until the data transfer is actually applied to the transmission media 410. Similarly, any messaging requests are first processed by the SMTP proxy server layer 418, and thereafter processed by the SMTP protocol and other lower layers 415, 413, 411 until the physical layer is reached. The present invention is particularly advantageous because all virus screening is performed below the application level. Therefore, the applications are unaware that such virus detection and elimination is being performed, and these operations are completely transparent to the operation of the application level layers 406. While the FTP proxy server layer 421 and the SMTP proxy server layer 422 have been shown in FIG. 4 as being their own layer to demonstrate the coupling effects they provide between the file transfer layer 423 and file transfer protocol 417, and the electronic mail layer 424 and the SMTP protocol layer 418, those skilled in the art will realize that the FTP proxy server layer 421 and the SMTP proxy server layer 422 can also be correctly viewed as being part of the file transfer protocol layer 417 and the SMTP protocol layer 418, respectively, because they are invisible or transparent to the application layer 406.

Figure 5A:
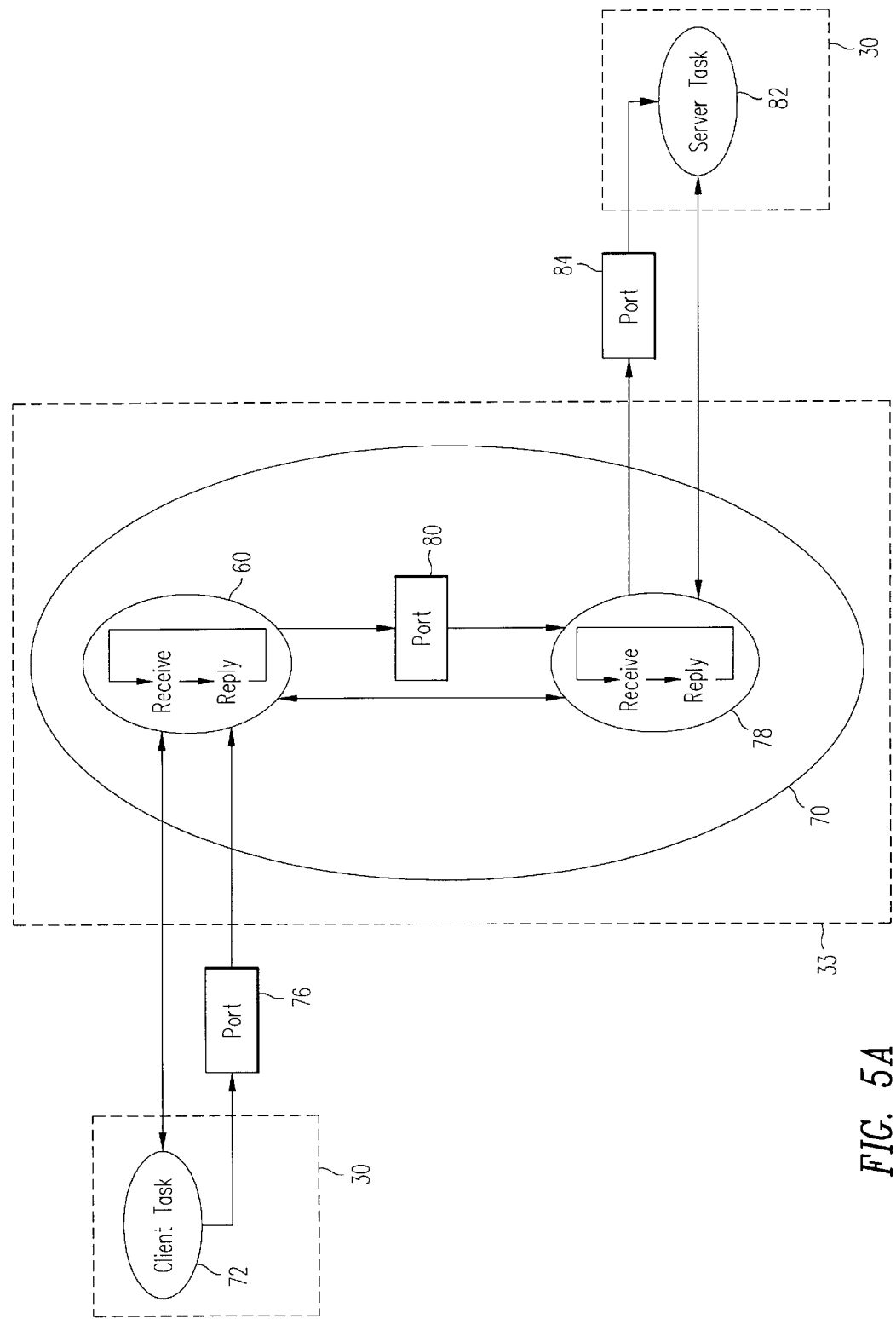
FIG. 5A is a functional block diagram showing a preferred system for sending data files according to a preferred embodiment of the present invention.
Figure 5B:
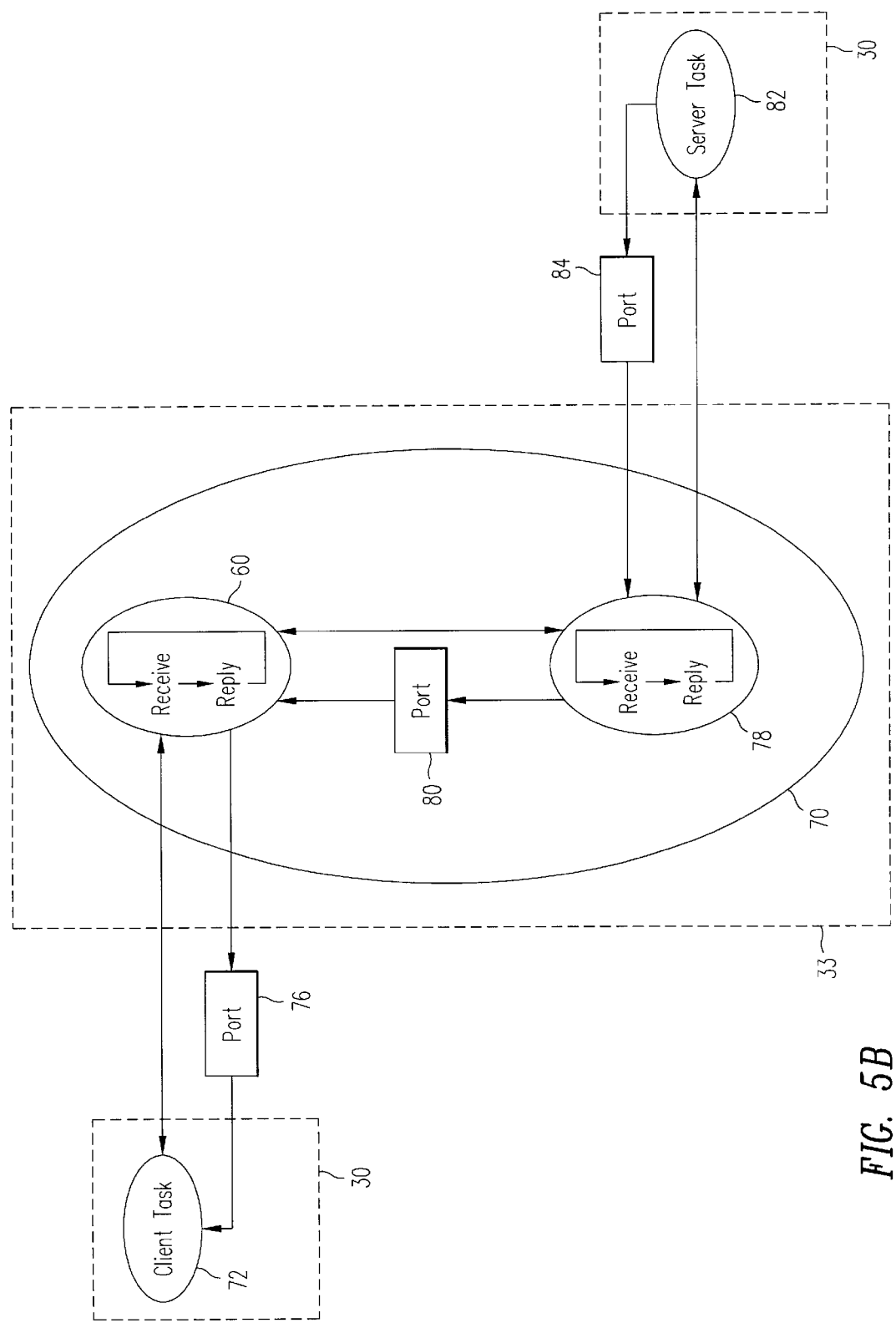
FIG. 5B is a functional block diagram showing a preferred system for receiving data files according to a preferred embodiment of the present invention.

A preferred method of operation and an embodiment for the FTP proxy server 60 will be described focusing on its relationship to and its control of the gateway node 33, and thus, control over access to the medium, line 34, for connections to other networks. The method can best be understood with reference to FIGS. 5A and 5B, that graphically show the functions performed by an Internet daemon 70, the FTP proxy server 60, and an FTP daemon 78, each of which resides on the gateway note 33. In FIGS. 5A and 5B, like reference numbers have been used for like parts and the figures are different only in the direction in which the file is being transferred (either from client task 72 to server task 82 or from server task 82 to client task 72). For the sake of clarity and ease of understanding only the data ports are shown in FIGS. 5A and 5B, and the bi-directional lines represent command or control pathways and are assumed to include a command port although it is not explicitly shown. The operation FTP proxy server 60 will now be described with reference to a file transfer between a client task 72 (requesting machine) and a server task 82 (supplying machine). While it is assumed that the client task 72 (requesting machine) is inside a protected domain and the server task 82 (supplying machine) is outside the protected domain, the invention described below is also used by the gateway node 33 when client task 72 (requesting machine) is outside the protected domain and the server task 82 (supplying machine) is inside the protected domain.

Figure 6A:
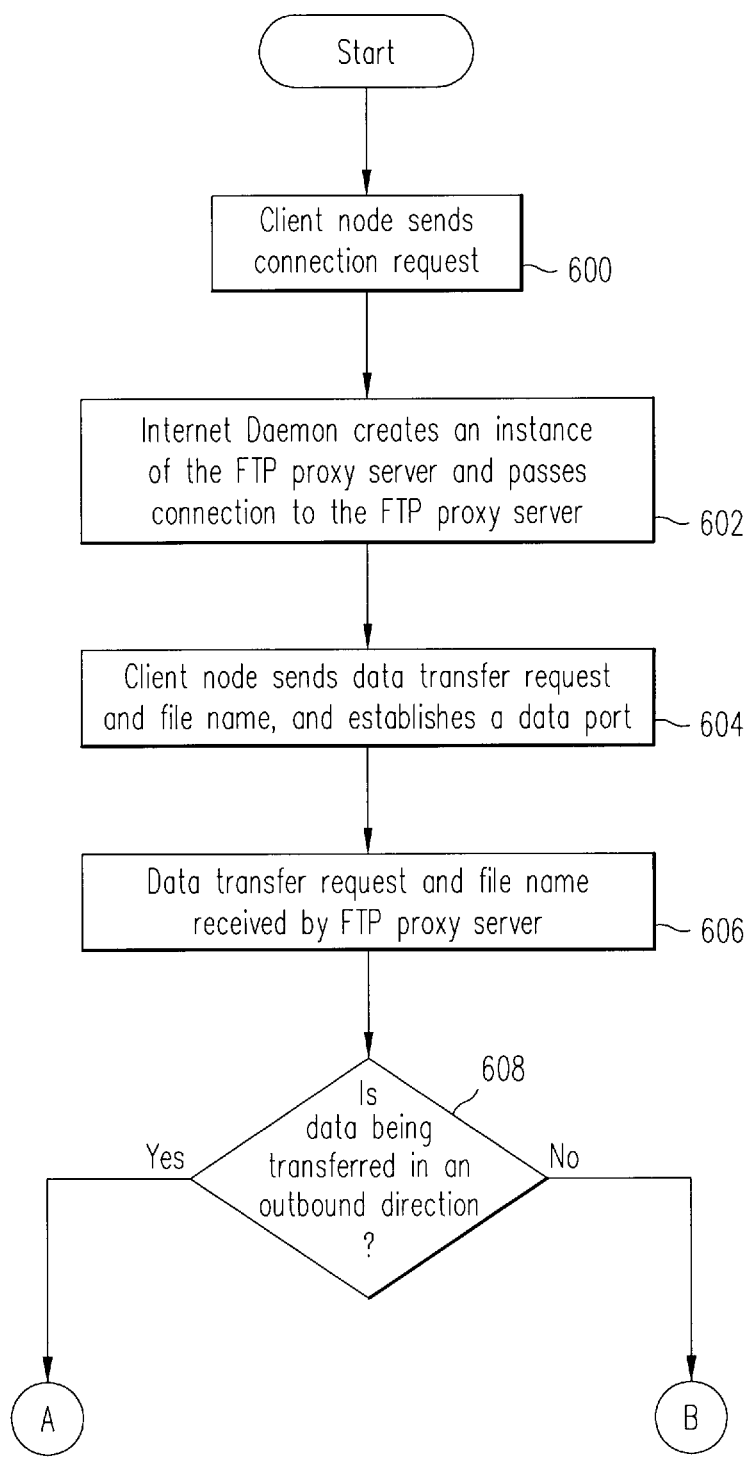
FIGS. 6A, 6B and 6C are a flowchart of the preferred method for performing file transfer according to the present invention.
Figure 6B:
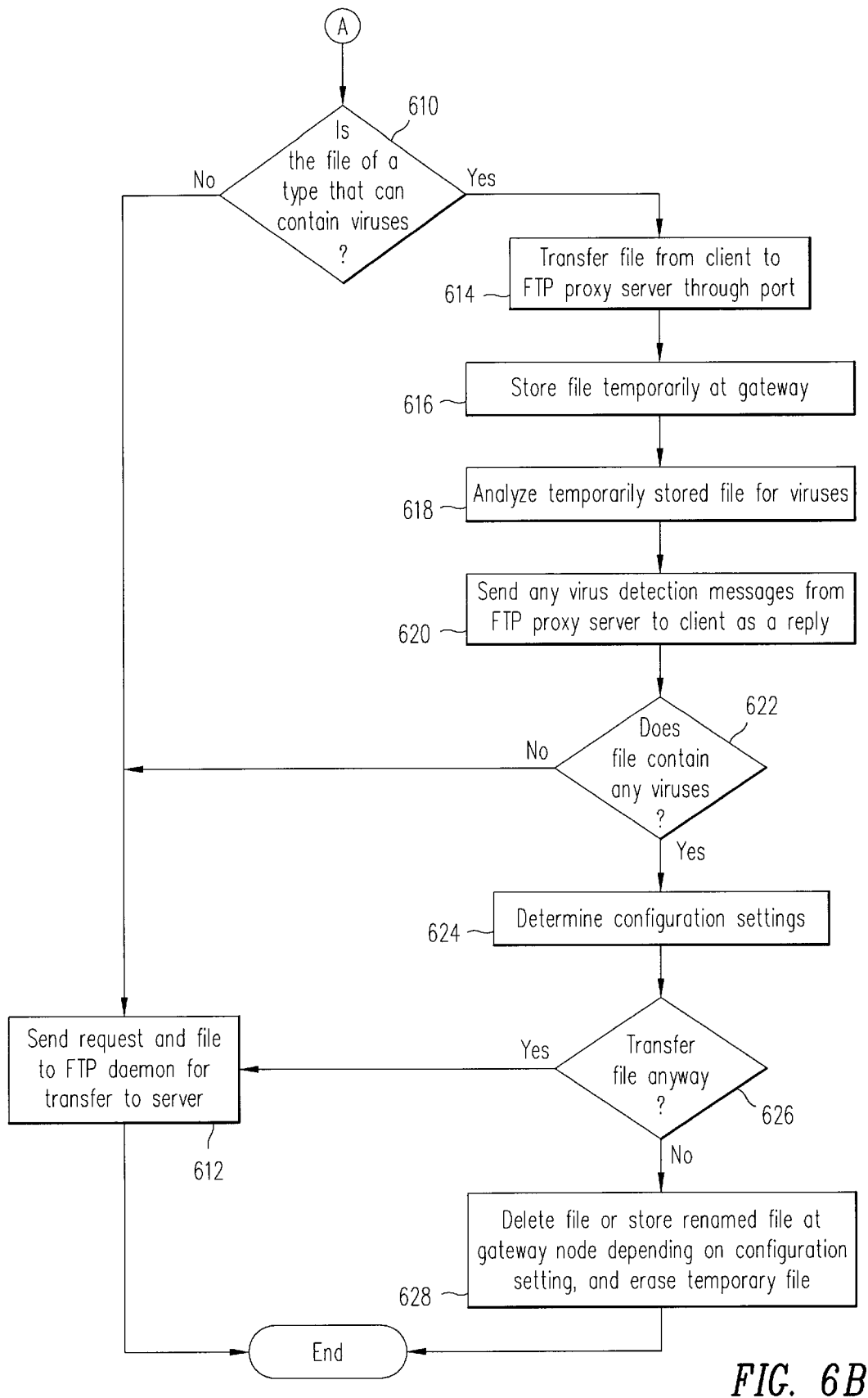
Figure 6C:
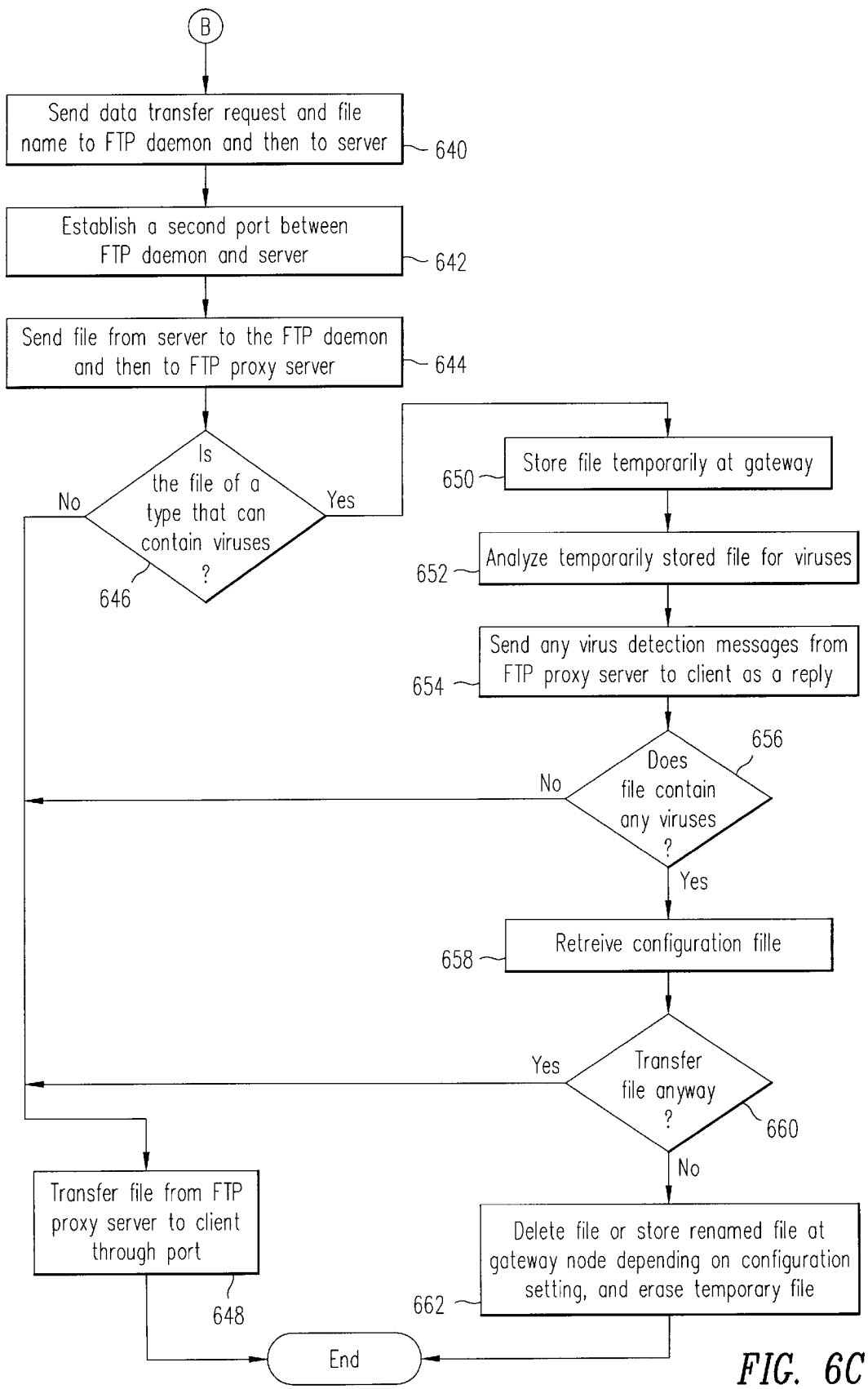

FIGS. 6A–6C are a flowchart of a preferred method for performing file transfers from a controlled domain of a network across a medium 34 to another network (e.g., a file transfer from a node 32 of the second network 24 across the media 34 to a second node 32 of the third network 26). The method begins with step 600 with the client node sending a connection request over the network to the gateway node 33. In step 602, The gateway node 33 preferably has an operating system 64 as described above, and part of the operating system 64 includes a fire wall, or program including routines for authenticating users. The gateway node 33 first tries to authenticate the user and decide whether to allow the connections requested, once the request is received. This is done in a conventional manner typically available as part of UNIX. The Internet daemon 70 creates an instance of the FTP proxy server 60 and passes the connection to the FTP proxy server 60 for servicing in step 602. The Internet daemon 70 is program that is part of the operating system 64, and it runs in the background. When being run, one of the functions of the Internet daemon 70 is to bind socket ports for many well-known services, such as TELNET, login, and FTP. When a connect request is detected, the Internet daemon 70 constructed in accordance with the present invention, spawns the FTP proxy server 60, which is the server that will actually handle the data transfer. Thereafter, the FTP proxy server 60 controls the network traffic passing between the client task 72 and the server task 82. Then in step 604, the client node sends a data transfer request and file name, and established a first data port 76 through which the data will be transferred between the FTP proxy server 60 and the client task 72. In step 606 the data transfer request and file name are received by the FTP proxy server 60. In step 608, the FTP proxy server 60 determines whether the data is being transferred in an outbound direction (e.g., the file is being transferred from the client task 72 to the server task 82). This can be determined by the FTP proxy server 60 by comparing the data transfer request. For example, if the data transfer request is the STOR command then the data is being transferred in an outbound direction; and if the data transfer request is the RETR command then the data is not being transferred in an outbound direction.

If the data is being transferred in an outbound direction, then the method transitions from step 608 to step 610. Referring now to FIG. 6B in conjunction with FIG. 5A, the process for transferring data out of the protected domain of the network is described in more detail. In step 610, the FTP proxy server 60 determines whether the file to be transferred is of a type that can contain viruses. This step is preferably performed by checking the extension of the file name. For example, .txt, .bmd, .pcx and .gif extension files indicate that the file is not likely to contain viruses while .exe, .zip, and .com extension files are of the type that often contain viruses. If the file to be transferred is not of a type that can contain viruses, then the method continues in step 612. In step 612, a second data port 80 is established and the data transfer request & the file are sent from the FTP proxy server 60 to the FTP daemon 78 so that the file can be sent to the server task 82. The FTP daemon 78 is a program executed by the gateway node 33 that communicates the transfer commands to the server task 82, establishes a third port 84 for sending the file including binding the server task 82 and FTP daemon 78 to the third port 84, and transmits the file to the server task 82. Once transmitted, the method is complete and ends. However, if it is determined in step 610 that the file to be transferred is of a type that can contain viruses, the method proceeds to step 614. In step 614, the FTP proxy server 60 transfers the file from the client to the FTP proxy server 60 through the first port 76, and in step 616, the file is temporarily stored at the gateway node 33. Then in step 618, the temporarily stored file is analyzed to determine if it contains viruses. This is preferably done by invoking a virus-checking program on the temporarily stored file. For example, a program the performs a version of signature scanning virus detection such as PC-Cillin manufactured and sold by Trend Micro Devices Incorporated of Cupertino, Calif. may be used. However, those skilled in the art will realize that various other virus detection methods may also be used in step 618. In step 620, output of the virus checking program is preferably echoed to the user/client task 72 by the FTP proxy server 60 as part of a reply message. Next in step 622, the method determines whether any viruses were detected. If no viruses are detected, the method continues in step 612 and transmits the file as has been described above. However, if a virus is detected, the present invention advantageously allows the FTP proxy server 60 to respond in any number of a variety of ways. The response of the FTP proxy server 60 is determined according to user's needs and wants as specified in a configuration file. This configuration file is preferably fully modifiable according to input from the user and stored in memory 44. For example, some options the user might specify are: 1) to do nothing and transfer the file; 2) to delete or erase the temporary file and do not transfer the file; or 3) to rename the file and store it in a specified directory on the gateway node 33 and notify the user of the new file name and directory path which can used to manually request the file from the system administrator. Those skilled in the art will realize that there are variety of other alternatives that users might specify, and steps 624, 626, and 628 are provided only by way of example. Next in step 624, the configuration file is retrieved to determine the handling of the temporary file. In step 626, the FTP proxy server 60 determines if it is to ignore the existence of a virus and a continue the transfer. If so, the method continues in step 612 where the file is passed to the FTP daemon 78 and the temporary file is deleted. If not the method continues to step 628 where either the file is deleted and not sent to the server task 82, and the temporary file is erased from the gateway node 33; or the file is renamed and stored in a specified directory on the gateway node 33 and the user is notified of the new file name and directory path which can used to manually request the file from the system administrator, and the temporary file is erased the gateway node 33. The action taken in step 628 depends on the configuration settings as determined in step 624. After step 628, the method ends. As can be seen from FIG. 5A, the path for the file is from client task 72 through the first data port 76 to the FTP proxy server 60, then to the FTP daemon 78 through the second data port 80 and finally to the server task 82 through the third data port 84.

Referring back to step 608 of FIG. 6A, if the data is not being transferred in an outbound direction, then the method transitions from step 608 to step 640. Referring now to FIG. 6C in conjunction with FIG. 5B, the process for transferring data into the protected domain of the network is described in more detail. In step 640, the FTP proxy server 60 next sends the data transfer request and file name first to the FTP daemon 78 and then on to the server task 82. In step 642, a second port 80 is established between the FTP proxy server 60 and the FTP daemon 78. Then a third data port 84 is established between the FTP daemon 78 and the server task 82. Both ports 80, 84 are established similar to the establishment of the first port 76. The FTP daemon 78 will request and obtain the third port 84 from the Internet daemon 70, and send a port command to the server task 82 including an address for the third port 84. The server task 82 will then connect to the third port 84 and begin the data transfer in step 644. The FTP daemon 78 in turn sends the file to the FTP proxy server 60. Next in step 646, the FTP proxy server 60 determines whether the file to be transferred is of a type that can contain viruses. This is done the same was as described above with reference to step 610. If the file to be transferred is not of a type that can contain viruses, then the method continues in step 648 where the file is transferred from the FTP proxy server 60 through the first port 76 to the client task 72, then the method is complete and ends. On the other hand, if the file to be transferred is a type that can contain viruses, the method in step 650 temporarily stores the file at the gateway node. Then in step 652, the temporarily stored file is analyzed to determine if it contains viruses. The analysis here is the same as step 618. In step 652, the output of the virus checking program is preferably echoed to the client task 72 by the FTP proxy server 60 as part of a reply message. Next in step 656, the method determines whether any viruses were detected. If no viruses are detected, the method continues in step 648 as has been described above. However, if a virus is detected, the present invention retrieves the configuration file to determine the handling of the temporary file. In step 660, the FTP proxy server 60 determines if it is to ignore the existence of a virus and a continue the file transfer. If so the method continues in step 648 where the file is passed to the client task 72 and the temporary file is erased. If not the method continues to step 662 where the temporary file is erased, and the file is either deleted and not sent to the client task 72 or the file is renamed, stored on the gateway node 33, and the client task 72 is notified of new name and path so that the file may be manually retrieved by the system administrator. The method then ends. As can be seen from FIG. 5B, the data transfer request is passed from the client task 72, to the FTP proxy server 60, then to the FTP daemon 78, and to the server task 82 which in response sends the file through the third port to the FTP daemon 78, and through the second port 80 on to the FTP proxy server 60, and finally through the first port 76 to the client task 72.

Figure 7:
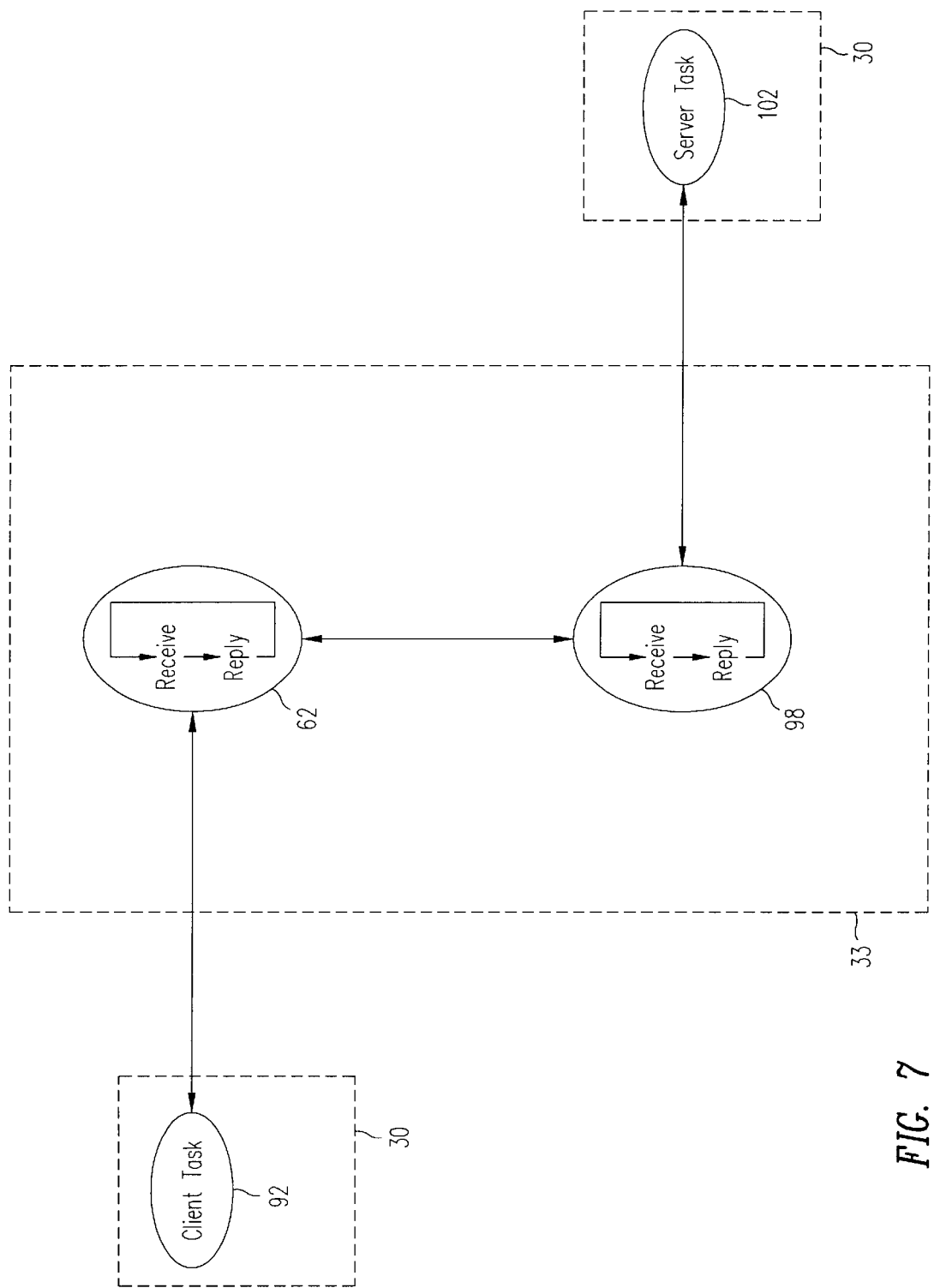
FIG. 7 is a functional block diagram showing a preferred system for transmitting mail messages according to a preferred embodiment of the present invention.
Figure 8A:
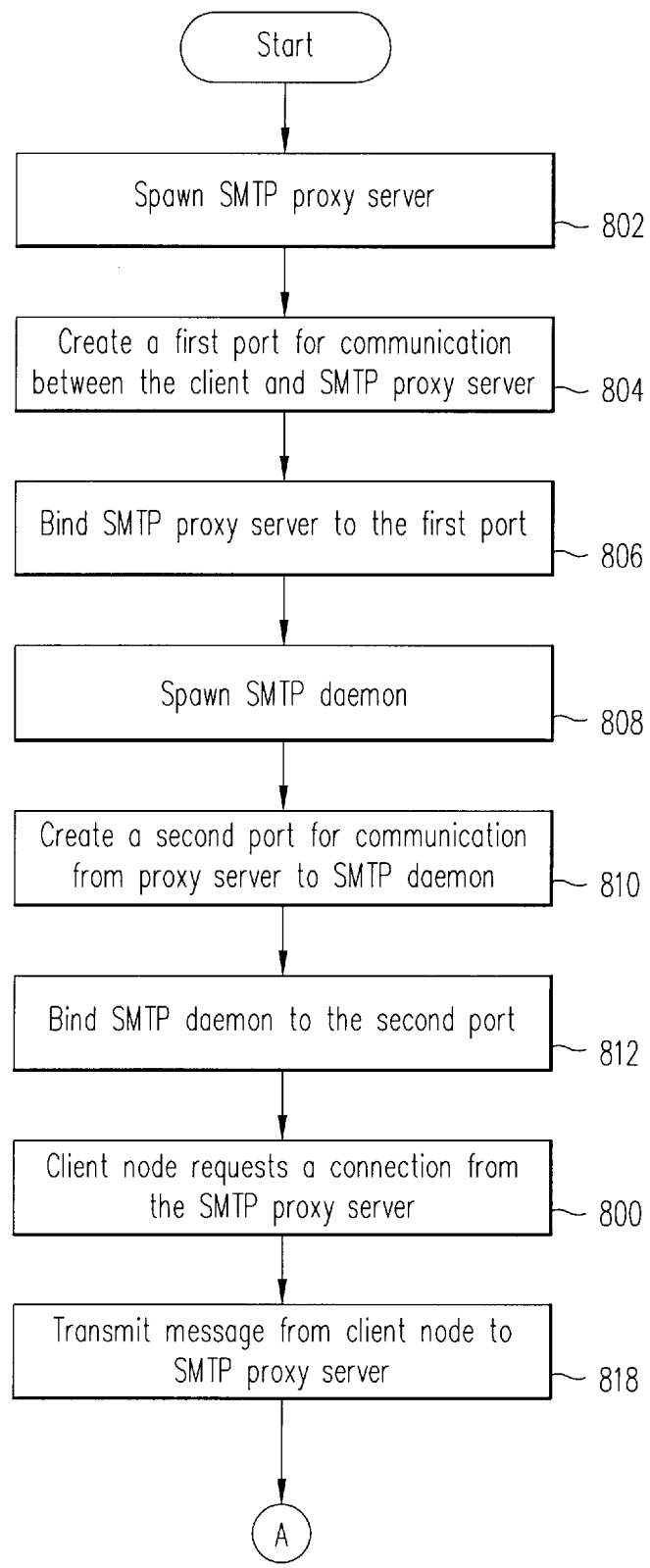
FIGS. 8A and 8B are a flow chart of a preferred method for sending messages to/from a network.
Figure 8B:
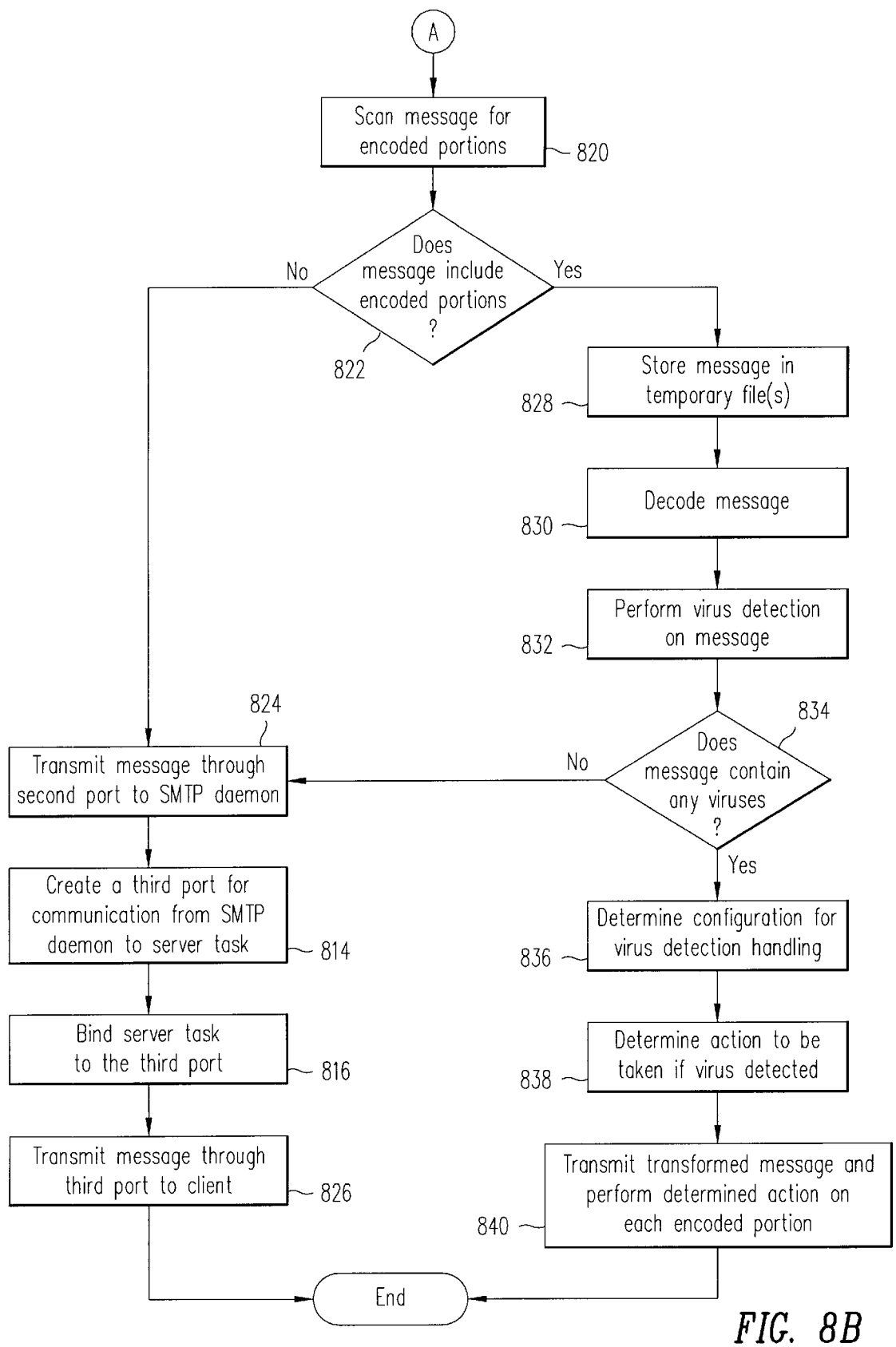

Referring now to FIGS. 7, 8A and 8B, the operation of the SMTP proxy server 62 will now be described. The SMTP proxy server 62 controls the only other entry channel through which data, and therefore viruses, can enter the protected domain of a given network. The SMTP proxy server 62 is preferably a program that resides on the gateway node 33, and controls and handles all transfers of electronic messages or mail in and out of the network through the communications unit 54 and media 34. While the SMTP proxy server 62 will now be described with reference to the transfer of a mail message from a client task 92 within the protected domain of the network to a server task 102 at a node on a different network outside the protected domain, those skilled in the art will understand how the SMTP proxy server 62 handles incoming mail messages in the same way. All mail messages are handled by the SMTP proxy server 62 in the same way and only the designation of which node 32 is the server and which is the client change depending on the direction the message is being sent from the perspective of the gateway node 33. Since mail messages are passed using the command pathways between nodes, only these pathways are shown in FIG. 7. For ease of understanding, the command ports have not been shown in FIG. 7, but will be discussed below in the relevant steps of the preferred method.

Referring now to FIG. 8A, the preferred method of the present invention for sending electronic mail begins in step 802 with the spawning or running the SMTP proxy server 62. Next in step 804, a first command port 96 for communication between the client task(s) 92 and the SMTP proxy server 62 is created. The address of the first port 96 along with a port command is provided to the SMTP proxy server 62. Then in step 806, the SMTP proxy server 62 is bound to the first port 96 to establish a channel for sending a mail message between any client tasks and the SMTP proxy server 62. Next in step 808, the SMTP proxy server 62 spawns a SMTP daemon 98 or SMTP server. The SMTP daemon 98 is preferably the existing program "sendmail" that is part of the BSD UNIX operating system. This is particularly advantageous because it reduces the amount of code that needs to be written and assures compatibility with the lower layers of the OSI reference model. Then in step 810 a second command port is created for communication between the SMTP proxy server 62 and the SMTP daemon 98. In step 812, the SMTP daemon 98 is bound to the second command port for communication with the SMTP proxy server 62. Actually, the present invention binds the SMTP daemon 98 to the appropriate port, namely the second port by redefining the bind function in a shared library that is part of the operating system 64. The present invention advantageously exploits the fact that the SMTP daemon 98 (sendmail programs on most UNIX systems) are dynamically linked. The present invention utilizes a shared library which redefines the system call bind( ) and forces sendmail to link with the redefined version of the bind( ) call when executed. If the redefined version of the bind( ) call determines the SMTP daemon 98 (sendmail program) is trying to bind to the first command port (the smtp port), it will return to it a socket whose other end is the SMTP proxy server 62 (a socket to the second command port). Next in step 800, the client task 92 request a connection from the SMTP proxy server and is directed to used the first command port for communication. Then in step 818, the message is transmitted from the client task 92 through the first command port to the SMTP proxy server 62.

Referring now to FIG. 8B, the method continues in step 820 with the SMTP proxy server 62 scanning the message body and checking for any portions that are encoded. The present invention preferably scans the message for portions that have been encoded with an "uuencoded" encoding scheme that encodes binary data to ASCII data. "Uuencoded" portions of messages usually start with a line like "begin 644 filename," and end with a line like "end." The existence of such encoded portions suggests the possibility that a file may contain viruses. This scanning for "uuencoded" portions is just one of many scanning techniques that may be used, and those skilled in the art will realize that the present invention could be modified to scan for other encoded portions such as those encoded according to other schemes such as mime. Next in step 822, the SMTP proxy server 62 determines whether the message includes any encoded portions. If the message does not include any encoded portions, the SMTP proxy server 62 transmits the message through the second command port to the SMTP daemon 98 in step 824. Next in step 814, the SMTP daemon 98 creates a third command port for communication between the SMTP daemon 98 and the server task 102. Then in step 816 the server task 102 is bound to the third command port to establish communication between the server task 102 and the SMTP daemon 98. Those skilled in the art will realize that if the server task 102 resides on the gateway node 33, then steps 814 and 816 are not needed and may be omitted since no further transfer of data across the network is needed. Then the SMTP daemon 98 transmits the message through the third command port to the server task 102 in step 826 thereby completing the method.

On the other hand if in step 822 it is determined the message does include encoded portions, the SMTP proxy server 62 stores each of the encoded portions of the message in its own temporary file at the gateway node 33 in step 828. For example, if a message included three encoded portions, each encoded portion will be stored in a separate file. Then in step 830, each of the encoded portions stored in its own file is individually decoded using uudecode program, as will be understood by those skilled in the art. Such decoding programs known in the art convert the ASCII files back to their original binary code. Next in step 832, the SMTP proxy server 62 calls and executes a virus-checking program on each message portion stored in its temporary file(s). Then in step 834, the SMTP proxy server 62 determines whether any viruses were detected. If no viruses are detected, the method continues to steps 824, 814, 816 and 826 as has been described above. However, if a virus is detected, the present invention advantageously allows the SMTP proxy server 62 to respond in any number of a variety of ways, just as the FTP proxy server 60. The response of the SMTP proxy server 62 is also determined by the according to user's needs and wants as specified in a configuration file. This configuration file is preferably fully modifiable according to input from the user. The configuration for virus handling is determined in step 836. This could be done by retrieving and reading the configuration file or simply retrieving the configuration data already stored in memory 44. Then in step 838, the action to be taken is determined from the configuration settings. For example, some options the user might specify are: 1) to do nothing and transfer the mail message unchanged; 2) to transfer the mail message with the encoded portions that have been determined to have viruses deleted from the mail message; 3) rename the encode portions of the message containing viruses, store the renamed portions as files in a specified directory on the SMTP proxy server 62 and notify the user of the renamed files and directory path which can used to manually request the file from the system administrator; or 4) writing the output of step 832 into the mail message in place of the respective encoded portions and sending that mail message in steps 824 and 826. Once the action to be performed has been determined from examination of the configuration file, the specified action is taken in step 840, the transformed message is transmitted, the temporary file is erased, and the method ends. For example, if a message has three encoded portions, two encoded portions contain viruses, and the configuration file indicates that virus containing portions are to be deleted, then the method of the present invention would send a transformed message that was the same as the original message, but with the two encoded portions containing viruses deleted, to the server task 102.

The present invention also includes an apparatus and method for virus detection in conventional electronic mail systems 200 such as the one shown in FIG. 9. In contrast to the detection of viruses on data passing through a network gateway node 33, this apparatus and method generally performs virus detection on data transmitted to client nodes 230 by electronic mail sent through a postal node 232, and thus, can prevent the spread of viruses not exclusively introduced through the gateway node 33. For example, viruses may be introduced into the network 200 at the client node 230 by floppy disk or by modem access to the Internet and such viruses may be subsequently spread from a particular client node 230 throughout the network 200 by electronic mail which passes through the postal node 232.

Electronic mail systems generally implement the asynchronous access of messages among and between parties using a storage and forward/retrieve model. For example, a postal node 232 may store messages for ultimate forwarding to or retrieval by a client node 230. Each message generally has an associated status (read or unread) with regard to whether the message has been read by the client. The messages may contain simple text, graphic files or complex executable files which, as indicated, may carry viruses.

Referring now to FIG. 10a, a block diagram of a postal node 232 is shown. Similar to the gateway node 33, the postal node 232 comprises a display device 258, CPU 260, a memory 262, a data storage device 264, an input device 266, a network link 268, and a communications unit 269. The CPU 260 is connected by a bus 270 to the display device 258, the memory 262, the data storage device 264, the input device 266, the network link 268, and the communications unit 269 in a von Neumann architecture. The CPU 260, display device 258, input device 266, and memory 262 may be coupled in a conventional manner such as provided in a personal computer. The preferences and alternatives regarding the arrangement of the postal node 232, the CPU 260, display device 258, input device 266 and data storage device 264 are similar to those described in connection with the gateway node 33.

The bus 270 is coupled to the network link 268 to facilitate communication between the postal node 232 and other network nodes 230, such as the client nodes, through a cable or line 236. Additionally, the bus 270 is coupled to the communications unit 269 for communications such as data and messages sent between the postal node 232 and other networks (not shown). Again, the network link 268 and communications unit 269 preferences and alternatives are similar to those set forth in the description of the gateway node 33. The skilled artisan will realize the variety of network configurations and operating systems and that this embodiment is independent of their use.

Generally, the CPU 260 of the postal node 232, under the guidance and control of instructions received from the memory 262 and from input through the input device 266, provides for the access of data in the form of electronic mail to or from the client nodes 230 and, in certain systems, to other nodes outside the local network (not shown).

Figure 10B:
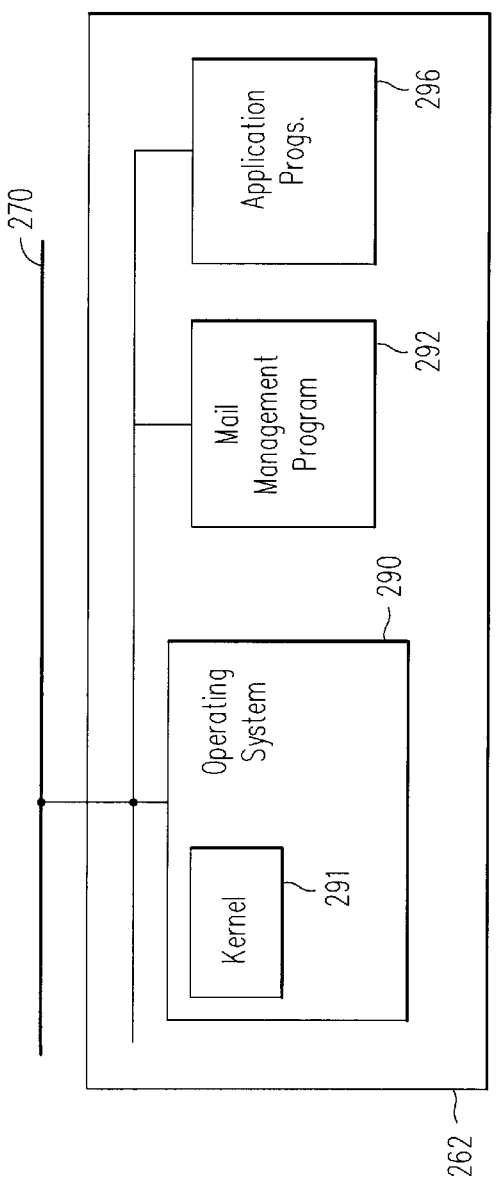
FIG. 10$a$ is a block diagram of a postal node constructed according to the present invention.

Now referring to FIG. 10b, the memory 262 for the postal node 232 is shown. The memory 262 is in communication with the bus 270 and preferably comprises an operating system 290 including a kernel 291, a mail management program 292 and any desired applications programs 296. The memory 262 is preferably a random access memory, but may also include read only memory.

Figure 10C:
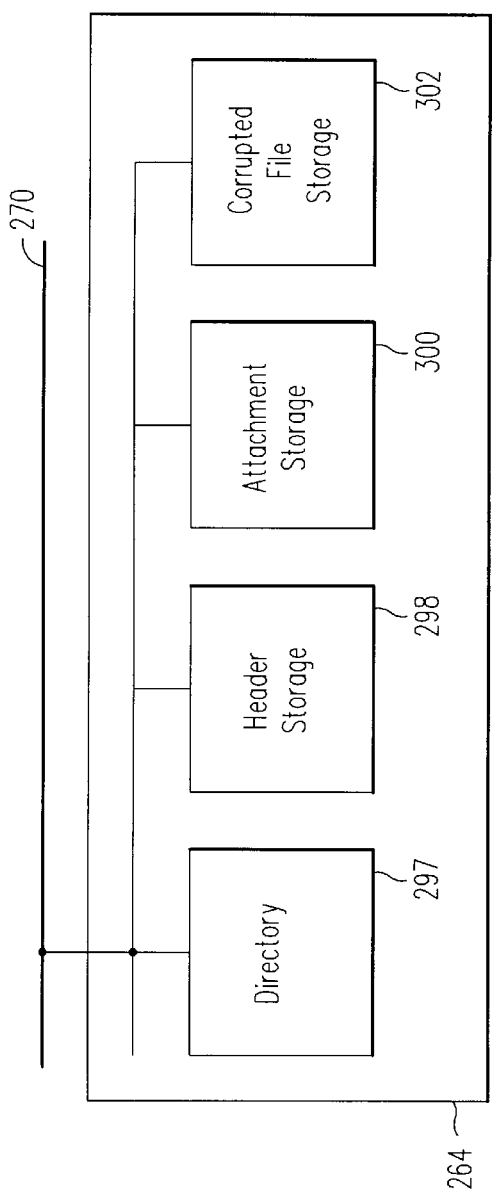

FIG. 10c details the data storage device 264 for the postal node 232 and is shown to include a directory 297, a header 298, an attachment 300, and a corrupted file 302 storage areas. The data storage device 264 preferably comprises a hard disk but the skilled artisan will recognize the various alternatives for the data storage device 264.

In an exemplary embodiment, the mail management program 292 is Lotus cc:Mail as provided by the Lotus Development Corporation. The mail management program 292 may alternatively be GroupWise as provided by Novell, BeyondMail as provided by Banyan Systems, Inc., MS-Mail as provided by Microsoft, or any other conventional type of electronic mail program. The mail management program 292 generally manages the access, storage and transfer of messages at the postal node 232 and may also include user assistance routines such as those associated with help and dictionary files. The directory 297, header 298 and attachment 300 storage areas will be located and arranged as required for operation with the mail management program 292 or as set up by the network installer or administrator. The directory 297 generally includes a list of network users who may send or receive messages. Typically, the directory 297 also includes a separate mailbox file for each user listed in the directory 297. The mailbox files include information about the user and, typically, pointers to information and the user's messages.

A message is the basic unit of communication in electronic mail systems. The message includes: 1) a unique message identifier, 2) a header which includes information about the message such as the sender, the recipient, logging and receipt information, the date and time of the message, its subject matter and other such data, and 3) attachments. The message may include one or more message attachments, which may be of various types such as files generated by the electronic mail program 292 text editor, files generated by network application programs 296 such as word processing or spread sheet files, executable files, or any other object or item which may be conventionally attached to an electronic mail message or transferred to the client node 230 in an electronic mail system 200. A typical message includes at least one attachment in the form of a message body generated by the electronic mail program text editor. The information in the header may be stored in the header storage area 298, which may also include one or more pointers to the location of the message attachments. The attachment files may be stored in an attachment storage area 300.

Messages, including those with attachments, may be sent to numerous recipients. In such cases, certain mail management programs 292 provide message headers for each recipient with a pointer to a single attachment file. These arrangements conserve data storage space at the postal node 232 as the attachments may be stored in one location for multiple recipients.

The message attachments described above are the primary media for the spread of viruses through the operation of the electronic mail system 200. The apparatus and method of the present invention will prevent the transfer of viruses to the client node 230, and by treating the viruses contained in attachments, particularly those addressed to multiple parties, may prevent their spread throughout the network 200.

Although an arrangement for the postal node 232 and particularly its data storage device 264 configuration for use with an electronic mail system has been described, it is understood that the data storage device 264 may be configured in any conventional fashion according to the requirements of the electronic mail system 200 and program 292 used. It is also understood that the client node 230 may service more than one mail user and that a single mail scanning module 276 of the present invention may be arranged to scan messages for all such users or, alternatively, may be provided separately for each user.

The corrupted file storage 302 area is shown at the postal node 232 data storage device 264 in accordance with an embodiment of the present invention, but it is understood that files which are found to be corrupt may be stored where desired.

Referring now to FIG. 11a, a block diagram of a client node 230 in accordance with the present invention is shown. The client node 230 comprises a display device 244, a CPU 246, a memory 248, a data storage device 250, an input device 252, and a network link 254. The CPU 246 is connected by a bus 256 to the display device 244, the memory 248, the data storage device 250, the input device 252, the network link 254 in a von Neumann architecture. The CPU 246, display device 244, input device 252, and memory 248 are coupled in a conventional manner such as provided in a personal computer. The preferences and alternatives regarding the arrangement of the client node 233, the CPU 246, the display device 244, the input device 252 and the data storage device 250 are similar to those described in connection with the gateway node 33 and the postal node 232.

The bus 256 is coupled to the network link 254 to facilitate communication between the client node 230 and other network nodes such as the postal node 232 through a cable or line 236. Again, the network link 254 preferences and alternatives are similar to those set forth in the description of the gateway 33 and postal 232 nodes. The skilled artisan will realize the a variety of network configurations and operating systems could alternatively be used and that this embodiment is independent of their use.

Generally, the CPU 246 of the client node 230, under the guidance and control of instructions received from the memory 262 and from input through the input device 266, facilitates, in conjunction with the postal node 232, the transfer of electronic mail to and from the client node 230, during normal operation. The apparatus and method of the present invention employ a virus detection scheme applicable to messages that operates outside of normal operation of a mail messaging system to permit access by the client node 230 to the messages residing at the postal node 232.

Referring now to FIG. 11b, a preferred embodiment of the memory 248 for a client node 230 in accordance with the present invention is shown in more detail. The memory 248 is in communication with the bus 256 and preferably comprises an operating system 272 including a kernel 273, a local electronic mail program 274, a mail scanning module 276 and any desired applications programs 278. The memory 248 is preferably a random access memory, but may also include read only memory.

The preferences and alternatives for the operating system 272 are similar to those set forth regarding the gateway node's operating system 64. The local electronic mail program 274 is typically arranged to correspond with the postal node 232 mail management program 292, and generally includes initialization and configuration files which allow the client node 230 to send and receive messages to and from the postal node 232 according to the settings. The application programs 278 may be spreadsheet, word-processing or other conventional types, and may work in conjunction with network application programs 296 or may be purely local.

In accordance with the present invention, the mail scanning module 276 includes routines for checking messages for viruses. Preferably, the mail scanning module 276 provides routines for polling the postal node 232 to determine whether any messages for the client node 230 are present at the postal node 232 and have an unscanned status, downloading unscanned messages into the memory 248 of the client node 230 without affecting the "unread" status of the messages, analyzing the messages to determine whether they contain viruses, and taking corrective action.

Referring now to FIG. 11c, a preferred embodiment for the mail scanning module 276 at a client node 230 is shown in more detail to include a mail scanning manager 280, a mail sending module 281, a polling module 282, a retrieval module 283, a data buffer 284, a scanned message FIFO buffer 285, a virus analyzing and treatment module 286 and decoder 288. As will be described, certain modules which are included in the mail scanning module 276 are arranged to communicate with the mail management program 292 and other portions of the postal node 232. For example, a module connected to the data bus 256 of the client node 230 may communicate with the postal node memory 262 or data storage device 264 through the network link 254, line 236, network link 268 and bus 270. Conventional techniques for the transfer of information through network channels may be implemented. The network link 254 between the postal node 232 and the mail scanning module 276, in conjunction with its independent functional capabilities described below, accommodates operation without requiring operation of the electronic mail program files 274 local to the client node 230. Thus, virus analysis and treatment may be conducted unobtrusively and without reliance upon user triggering.

The mail scanning manager 280 includes routines for coordinating and integrating the operations of the mail sending module 281, the polling module 282, the retrieval module 283, the data buffer 284, the scanned message FIFO buffer 285, the virus analysis and treatment module 286, the decoder 288 and the postal node 232. The mail scanning manager 280 includes configuration routines for selecting the operational settings of the mail scanning module 276.

Preferably, the mail polling module 282 includes routines for polling or accessing the postal node 232 to determine whether any new messages have arrived for the client and remained unscanned. Such routines are arranged to communicate with the mail management 292 and storage areas 264 of the postal node 232 and preferably emulate the polling routines of the electronic mail program 274, 292 used by the network 200. The polling routines include conventional ones, and may, for example, implement the Vendor Independent Messaging (VIM) interface of the electronic mail system or the Dynamic Data Exchange (DDE) interface. The polling routines may literally emulate the routines used by the electronic mail program 274, 292 and may be set according to the configuration settings of the mail scanning manager 280. The polling routines are preferably executed on a fixed time interval such as every 30 seconds to poll the postal node 232 and determine whether any unscanned message addressed to the client node 230 has been received. The polling module 282 uses and maintains the date in the scanned message FIFO buffer 285. The scanned message FIFO buffer 285 is a table that list the messages at the post office which are addressed to the client node, are unread and have already been scanned for viruses. As illustrated in FIG. 11d, the scanned message FIFO buffer 285 is preferably a portion of memory 248 fixed in sized to hold a plurality of entries, each entry having a message identification number, header information and one or more status bits. The buffer 285 is preferably a circular buffer or FIFO buffer, in that, once the buffer is filled with information on scanned messages, the oldest entry in the FIFO will be deleted to make room for the next entry. The process of polling for unscanned messages is performed by using conventional routines to determine if there is an unread message addressed to the client node 230 at the postal node 232. If there is, the polling retrieves the unique identification number (and other header information if necessary) and compares the unique identification number to the unique identification numbers stored in the scanned message FIFO buffer 285. If the unique identification number for the unread message is in the scanned message FIFO buffer 285, then the message is not download to the data buffer, the polling continues with the next unread message at the postal node. However, if the unique identification number for the unread message is not in the scanned message FIFO buffer 285, then the unique identification number is passed to the retrieval module 283 so that the message and its contents can be download to the data buffer 284.

The retrieval module 283 preferably includes routines for acquiring data from messages that are found to be unscanned by the polling module 282. Where an unscanned message is found, the retrieval module 283 preferably downloads the message from the postal node 282 into the data buffer 284 portion of memory 248 of the client node 230. As indicated, each message is uniquely identified by and ID number and includes a header which points to or references any attachment items or files, and such information enables the retrieval module 283 to download the attachment items to the data buffer 284 of the client node for further analysis. Once the retrieval module 283 has stored the message including attachment items in the data buffer 284, the retrieval module 283 signals the virus analysis and treatment module 286 that the information in the data buffer can be analyzed for viruses.

The virus analysis and treatment module 286 includes routines for determining whether items or files contain viruses and for cleaning corrupted files, objects or data. The mail scanning manager 280 directs the virus analyzing and treatment module 286 to act upon the items or files that have been downloaded into memory 256 and stored in the data buffer 284 by the retrieval module 283, which may then be scanned and treated using signature scanning, checksum, emulation or any conventional techniques for the detection and treatment of viruses such as those described in connection with the gateway node 33. The data buffer 284 is a temporary storage location in the memory 248 dedicated for holding information before it has been scanned. Since this data buffer is temporary and segregated, it ensures that potentially infected data will not be copied to the data storage device 250 until it has been scanned for viruses. Although the virus analysis and treatment module 286 is shown in integrated fashion, it is understood that separate modules may be provided for each function.

The decoder 288 preferably includes routines for decoding, decompressing, or otherwise preparing messages for scanning. For example, the conventional encryption and compression algorithms used by the electronic mail management program 274, 292 may be conveniently implemented. Inclusion of the decoder 288 at the client node 230 also permits access to any decoding algorithms which are used by the client node 230. The decoder 288 works in conjunction with the virus analysis and treatment module 286 at the direction of the mail scanning manager 280 to enable virus detection of encoded items or files.

Mail sending module 281 is provided to send messages using the network electronic mail system and preferably includes conventional routines which are used to mail-enable program applications. Dependent upon the mail scanning manager 280 configuration settings, the mail sending module 281 may be used to forward messages or attachments to parties such as the sender and recipient of the treated message or the network administrator.

Referring now to FIG. 11d, a block diagram of a preferred embodiment of the scanned message FIFO buffer 285 is shown. The scanned message FIFO buffer 285 includes message identification 310 fields with a status flag 312 associated therewith to indicate whether the identified message has been checked for viruses by the mail scanning module 276. The message identification fields 310 include data uniquely identifying each unscanned message whose information is copied from the postal node 232 and, thus, allows the mail scanning manager 280 to prevent redundant message data downloading and analyzing. Preferably, the message identification field 310 contains the same message identity data used by the postal node 232 to organize messages. The status flags 312 associated with each message allow the mail scanning manager 280 to prevent redundant treatment of unread messages. In another embodiment, the mail scanning manager 280 identifies messages which have been read by the user by monitoring activation and use of the mail program by the user, and removes message once they are read from the scanned message FIFO buffer 285 to conserve memory and/or prevent the scanning of messages that have already been retrieved by the user. In another embodiment, the scanned message FIFO buffer 285 may be a FIFO buffer sized to hold a desired amount of messages and wherein message data flows through the buffer so that identification and removal from the data buffer 284 of messages which are read by the user is not necessary.

Figure 12:
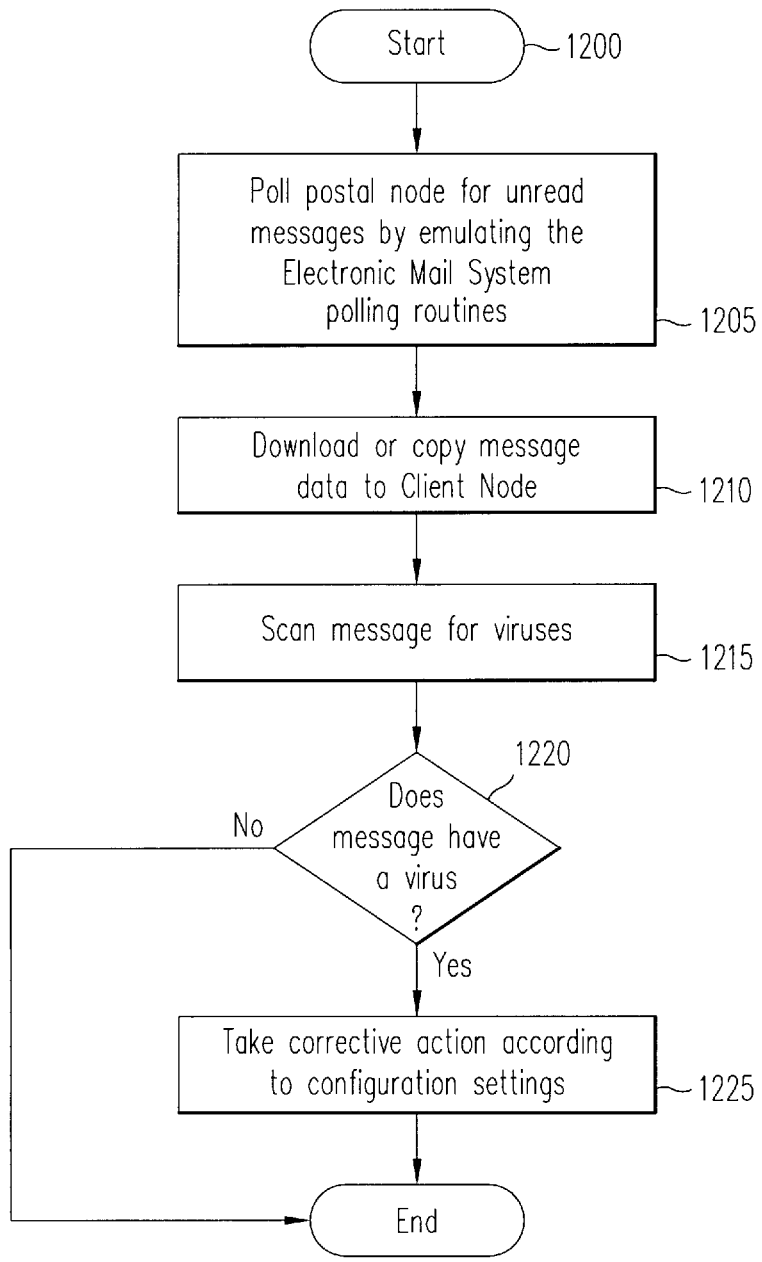
FIG. 12 is a flow chart of a first and preferred embodiment of the method for scanning electronic mail messages according to the present invention.

Now referring to FIG. 12, a preferred method of operation 1200 for the electronic mail scanning apparatus is shown. Preferably, the postal node 232 is polled 1205 by emulating the polling routines of the electronic mail system to determine whether any unscanned messages that are addressed to a predetermined recipient are present. When unscanned messages for the predetermined recipient are detected at the postal node 232, the mail scanning apparatus downloads 1210 the message, including any attachments, to memory 248 of the client node 230 assigned to the predetermined recipient. The preferred method then scans 1215 the message and attachment stored in memory 246 to determine 1220 whether the message or attachment contains a virus. Then in step 1220, the method determines whether the message includes a virus. If the message is found to have a virus, the mail scanning apparatus may then take corrective action 1225 regarding the infected message, by either removing the virus, sending a warning as part of the message, deleting the message or forwarding the message to a system administrator. Preferably, the polling routines 1205 operate without user input and without activation of the local electronic mail program 274 at the client node 230 to allow for unobtrusive detection and operation in the background.

Figure 13:
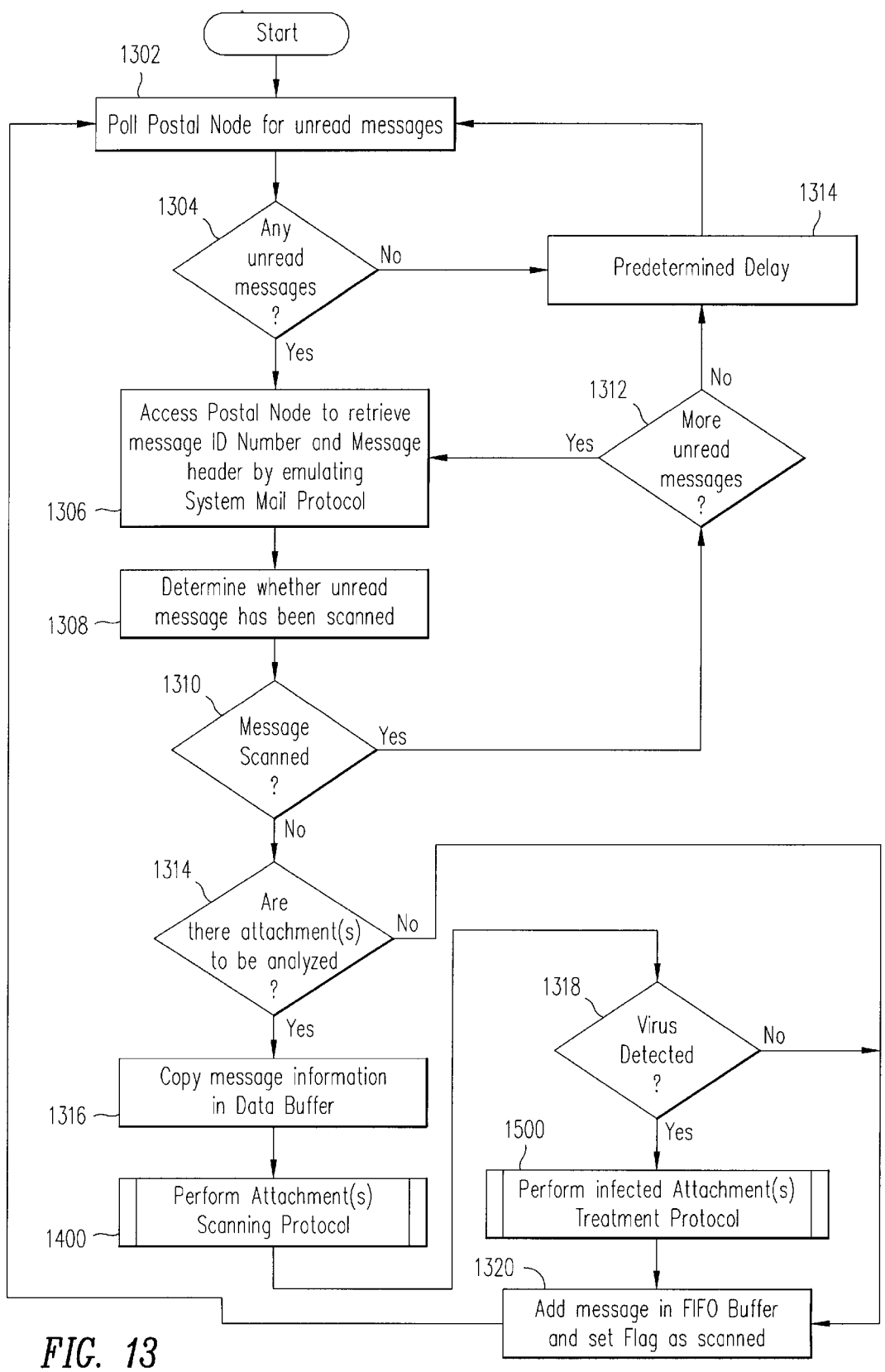
FIG. 13 is a flow chart of a second embodiment of the method for scanning electronic mail messages according to the present invention.

Referring now to FIG. 13, the preferred method for scanning electronic messages for viruses in the background is shown in more detail. The method begin in step 1302 with the client node 320 polling the postal node 232 for unread messages. Preferably the postal node 232 is polled 1305 for unread messages by executing routines that emulate the instructions of a conventional e-mail system. Then in step 1304, the method determines whether there are any message addressed to the client node. If there are not, the method continues in step 1314 by delaying a predetermined amount of time before returning to step 1302 to again poll the postal node 232. However, if there are unread message addressed to the client node 230 at the postal node 232, then the method proceeds to step 1306 where the postal node 232 is accessed, and the message identification number and message header are retrieved from the postal node. Next, in step 1308, the client node 230, in particular, the polling module 282 determines whether the message has been scanned. This is preferably done by comparing the retrieved message identification number and header to the message identification numbers and headers stored in the scanned message buffer 285. If match is found the message has been scanned. In step 1310, the method tests whether the message has been scanned. If the message has been scanned, the method moves to step 1312, where it determines if there are additional unread messages. If there are no more unread messages, the method proceeds to step 1314 and then back to polling. However, if there are more unread messages, the method continues processing the next message in through step 1306, 1308, 1310.

If a message has been found as unscanned, the method moves from step 1310 to step 1314. In step 1314, the method determines whether the unscanned message includes any attachments. If the message does not include attachments, the message identification number and header are stored in the scanned message FIFO buffer 285, and the message is flagged as checked. After step 285, the method returns to step 1302 to poll for new incoming messages addressed to the client node 230. However, if the message does include attachments, then the method downloads any necessary information pertaining to such messages, including the message header and any attachments into memory 248, specifically into the data buffer 284. Then in step 1400, the data in the data buffer 284 is analyzed or subjected to an attachment scanning protocol as will be described in more detail below with reference to FIG. 14. After data buffer 284 is analyzed, the method tests whether a virus was detected. If no virus was detected, then the method continues in step 1320 as has been described above. On the other hand, if a virus was detected, the method performs step 1500, as will be described below with reference to FIG. 15, and takes corrective action to handle the virus according to preset preferences of the user.

Figure 14:
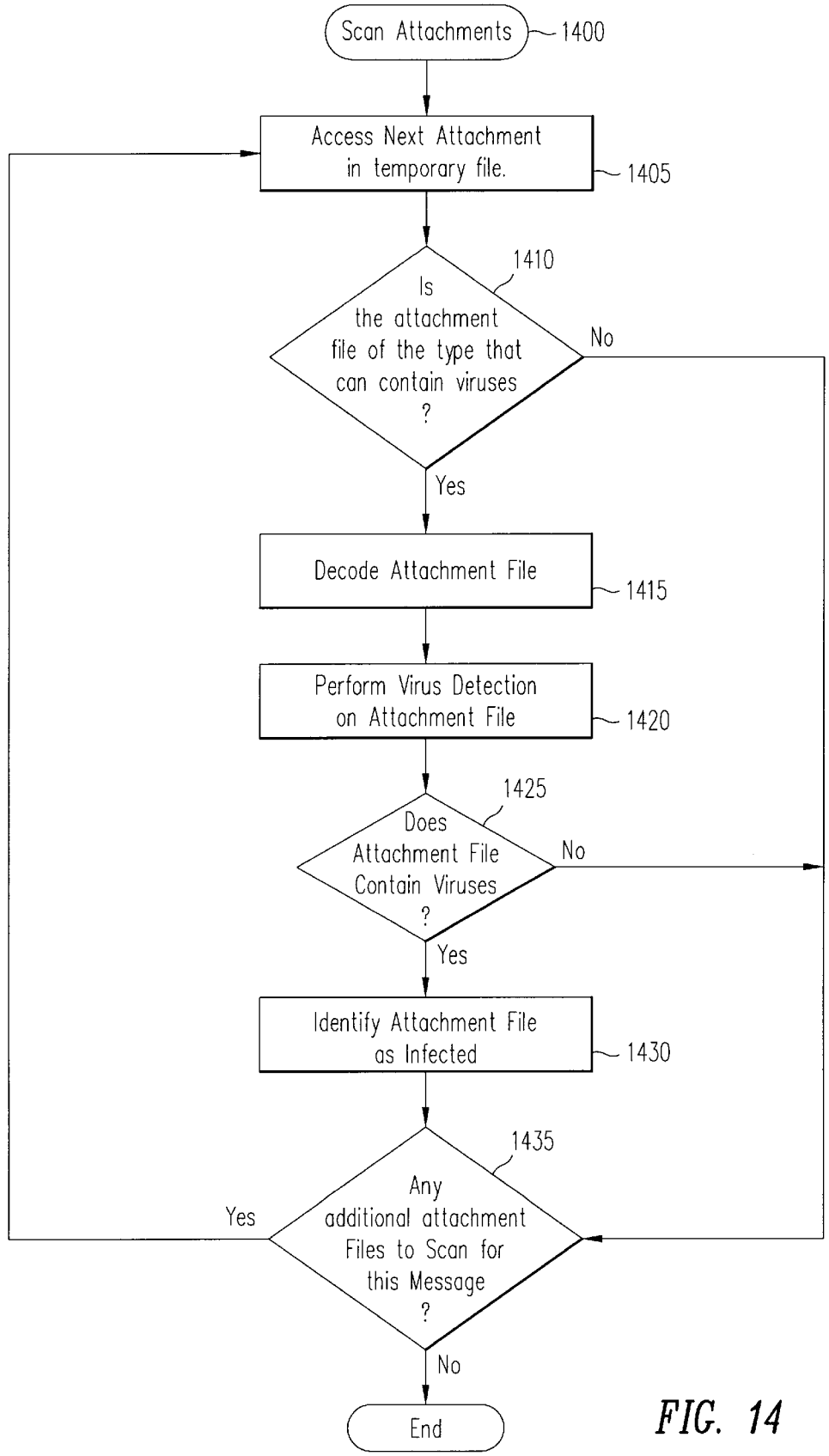
FIG. 14 is a flow chart of a preferred method for scanning an attachment file of an electronic mail message according to the present invention.

Now referring to FIG. 14, a preferred method of attachment scanning 1400 is shown. The next attachment in the data buffer 284 is accessed 1405 and it is determined 1410 whether the attachment is of the type that can contain viruses. This screening step may be controlled by the configuration settings of the mail scanning module 276 and the preferences and alternatives regarding such screening are similar to those described regarding virus detection at the gateway node 33. For example, .txt, .bmd, .pcx and .gif extension files may be omitted from scanning while each .exe, .zip and .com extension files may be scanned.

If the attachment is determined in step 1410 not to be of the type that may contain a virus, the method continues in step 1435 where it determines whether additional attachments are present and need scanning. If there are additional attachments needing scanning the method returns to step 1405, otherwise the method for scanning attachments is complete. However, if the file is found to be the type that may contain a virus in step 1410, then method continues in step 1415 where the attachment is decoded 1415 by the decoder module 288 so that the virus analyzing and treatment module 286 may scan it for viruses. As indicated in the descriptions of the decoder 288 and virus analysis and treatment module 286, the method of decoding may implement the conventional encryption and compression algorithms used by the electronic mail system or those available at the client node 230 and the scanning methods may include any conventional type such as signature, checksum or emulation. Next in step 1420, the method performs virus detection on the information in the data buffer 284. Next in step 1425, the method tests whether a virus has been detected. If the attachment is determined to contain viruses, the attachment is identified in step 1430 as infected so that it may be treated in step 1500 of FIG. 13. If additional attachments are presented 1435, they are then accessed 1405 and scanned the above method steps are repeated.

Figure 15:
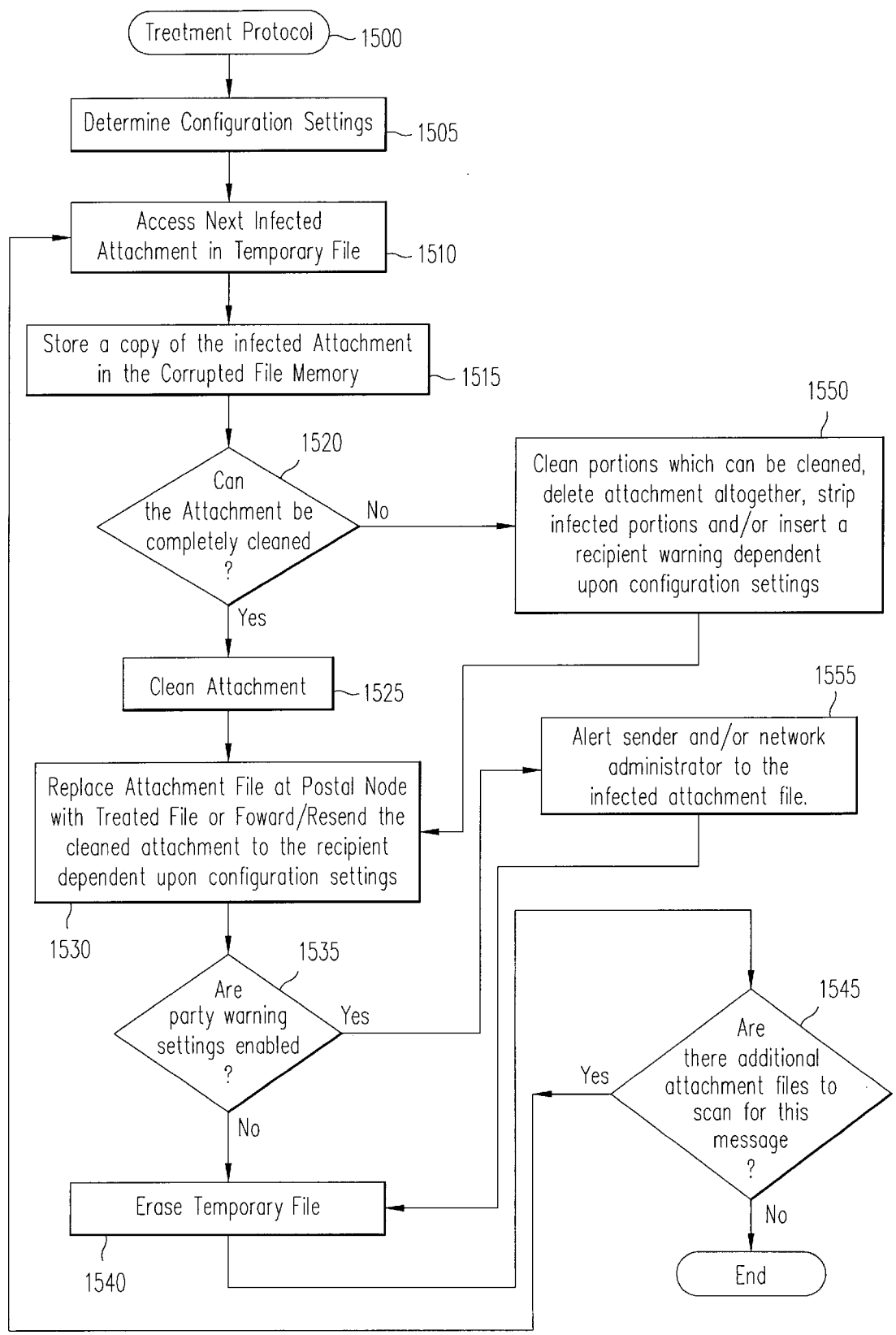
FIG. 15 is a flow chart of a preferred method for treating an infected attachment file according to the present invention to remove viruses.

Now referring to FIG. 15, a preferred method of attachment treatment 1500 is shown. The configuration settings which govern the virus analysis and treatment module 286 are determined 1505 from the mail scanning manager 280. The configurations settings are preferably set by the user to indicate what action if any the present invention is to perform upon detection of a virus. Then in step 1510 the next infected attachment file is accessed and stored in the temporary file or data buffer 284 for treatment. In an alternate embodiment, a copy of the infected attachment may be stored 1515 in the corrupted file storage location 302 for future reference. The attachment is then treated according to the configuration settings. Preferably, it is first determined 1520 whether the attachment can be completely cleaned. If it can, the attachment is cleaned 1525, and dependent upon the configuration settings, the infected attachment in the attachment storage location 300 may be replaced with the treated version and/or the treated version may be forwarded or resent to the recipient 1530 using, for example, the mail sending module 281.

If it is determined 1520 that the attachment cannot be completely cleaned, then it is partially treated 1550 in accordance with the configuration settings. Such treatment may include any of cleaning those portions of the attachment which can be cleaned, deleting the attachment altogether, stripping infected portions from the message, leaving the infected attachment file intact and providing a warning to the recipient. As with the completely treated attachment, the partially treated attachment may be used to replace the infected one in the attachment storage location 300 or may be forwarded or resent to the recipient 1530.

It is then determined 1535 whether party warning settings are enabled by the configuration settings wherein parties such as the mail sender and the network administrator may be alerted to or forwarded/sent 1555 the infected and/or treated file. After that, the temporary file may be erased 1540 and it may be determined 1545 whether additional attachments need to be analyzed.

The possible organization and processing of corrective action just described with reference to FIG. 15 is provided only by way of example. Those skilled in the art will realize that the corrective actions to handle viruses could include: 1) doing nothing; 2) removing the virus from the message; 3) notifying the recipient of the message of the presence of a virus; 4) notifying the system administrator that a message contains a virus; 5) notifying all addressees (i.e., all persons identified in the header to whom the message is addressed, carbon copied, blind carbon copied, or etc.) that the message contains a virus; 6) making the message unreadable by the recipient and others; 7) forwarding the message to the system administrator; 8) other combinations of the above actions; and that one or more of these corrective actions could be combined in a variety of ways in addition to that disclosed in FIG. 15.

While the present invention has been described with reference to certain preferred embodiments, those skilled in the art will recognize that various modifications may be provided.

For example, a preferred operation of the present invention specifies that the FTP proxy server 60 determine whether the file type is one that can contain a virus (Steps 610 and 646). However, alternate embodiments can omit these steps and simply temporarily store and scan all files being transferred for viruses. Likewise the SMTP proxy server 60 may, in alternate embodiments, omit the step 822 of determining whether the message is encoded and temporarily store and scan all message being transmitted for viruses. Furthermore, while the invention has been described above as temporarily storing the file or message at the gateway node in a temporary file, this step could be omitted in the determination of whether a file includes a virus were done as the file was being transferred from the client node to the gateway node.

It is also realized, with regard to the apparatus and method of detection of viruses in electronic mail systems 200, that the postal node 232 may act as the gateway node 33 for a given system and that a postal node 232 for a local area network (LAN) may exclude elements such as the communications unit 269 if no link to other networks is sought. Additionally, alternative embodiments may be provided for the mail scanning apparatus and method as recognized by the skilled artisan.

These and other variations upon and modifications to the described embodiments are provided for by the present invention which is limited only by the following claims.

What is claimed is:

1. An apparatus for detecting and selectively removing viruses in messages transferred using an electronic mail system, the apparatus comprising:
   a message detecting module, for detecting the presence of a message; and
   a virus analyzing module, in communication with the message detecting module, for determining whether data associated with the message contains a virus.

2. The apparatus of claim 1, further comprising:
   a retrieval module, in communication with the message detecting module and the virus analyzing module, for obtaining a copy of the data associated with the message and providing the copy of data to the virus analyzing module.

3. The apparatus of claim 2, further comprising:
   a virus treatment module, in communication with the virus analyzing module, for treating messages found to contain a virus.

4. The apparatus of claim 3, wherein the message is intended for access by a first node; the message detecting module, the retrieval module, the virus analyzing module, and the virus treatment module reside at the first node; and the message detected by the message detecting module resides at a second node.

5. The apparatus of claim 4, wherein the second node is a postal node in the electronic mail system.

6. The apparatus of claim 5, wherein the virus treatment module includes routines for replacing the attachment at the postal node with a cleaned attachment.

7. The apparatus of claim 1, wherein the message detecting module accesses a mailbox file in the detection of the message.

8. The apparatus of claim 7, wherein the message detecting module emulates polling routines used by the electronic mail system.

9. The apparatus of claim 4, wherein the message comprises a unique message identifier, a header, and at least one attachment.

10. The apparatus of claim 9, further comprising:
    a data buffer, in communication with the retrieval module, for keeping a record associated with the message, the record including a first field for storing an indication of the unique message identifier and a second field for storing an indication of whether the message has been analyzed.

11. The apparatus of claim 9, wherein the virus treatment module includes routines for performing a preset action on the message when a virus is detected in the message.

12. The apparatus of claim 11, wherein the preset action performed by the virus treatment module comprises at least one of: allowing message access by the first node without changing the message, preventing message access by the first node, notifying a party regarding the presence of the virus, and modifying the message to remove the virus.

13. The apparatus of claim 12, wherein the message modification performed by the virus treatment module to remove the virus comprises at least one of: cleaning portions of the attachment, deleting the attachment, and stripping infected portions from the attachment.

14. The apparatus of claim 3, wherein the message is intended for access by a first node, the message detecting module and the virus treatment module reside at a server; and the virus treatment module includes routines for performing a preset action on the message when a virus is detected in the message.

15. The apparatus of claim 14, wherein the preset action performed by the virus treatment module comprises at least one of: allowing message access by the first node without changing the message, preventing message access by the first node, notifying a party regarding the presence of the virus, and modifying the message to remove the virus.

16. The apparatus of claim 15, wherein the message modification performed by the virus treatment module to remove the virus comprises at least one of: cleaning portions of an attachment to the message, deleting the attachment, and stripping infected portions from the attachment.

17. A method for detecting and selectively removing viruses in messages transferred using an electronic mail system, the method comprising:
    detecting the presence of a message; and
    analyzing the message to determine whether data associated with the message contains a virus.

18. The method of claim 17, further comprising the steps of obtaining a copy of the data associated with the mail message and providing the copy of data for analysis.

19. The method of claim 18, further comprising:
    treating messages found to contain a virus.

20. The method of claim 19, wherein the message is intended for access by a first node; the steps of detecting the presence of a message and analyzing the message are undertaken at the first node; and the message that is detected resides at a second node.

21. The method of claim 20, wherein the second node is a postal node in the electronic mail system.

22. The method of claim 21, wherein the step of treating the message comprises:
    replacing an attachment at the postal node with a cleaned attachment, the attachment corresponding to the message.

23. The method of claim 17, wherein the step of detecting the presence of a message comprises accessing a mailbox file.

24. The method of claim 23, wherein the step of detecting the presence of a message comprises emulating the polling routines used by the electronic mail system.

25. The method of claim 20, wherein the message comprises a unique message identifier, a header, and at least one attachment.

26. The method of claim 25, further comprising:

recording the unique message identifier in a data buffer to log whether the message has been analyzed.

27. The method of claim 25, wherein the step of treating the message comprises performing a preset action on the message when a virus is detected in the message.

28. The method of claim 27, wherein the step of performing a preset action comprises at least one of the steps of: allowing message access by the first node without changing the message, preventing message access by the first node, notifying a party regarding the presence of the virus, and modifying the message to remove the virus.

29. The method of claim 28, wherein the step of modifying the message to remove the virus comprises at least one of the steps of: cleaning portions of the attachment, deleting the attachment, and stripping infected portions from the attachment.

30. The method of claim 19, wherein the message is intended for access by a first node, the step of detecting the presence of a message is undertaken at a server; and the step of treating the message comprises performing a preset action on the message when a virus is detected in the message.

31. The method of claim 30, wherein the step of performing a preset action comprises at least one of the steps of: allowing message access by the first node without changing the message, preventing message access by the first node, notifying a party regarding the presence of the virus, and modifying the message to remove the virus.

32. The method of claim 31, wherein the step of modifying the message to remove the virus comprises at least one of the steps of: cleaning portions of the attachment, deleting the attachment, and stripping infected portions from the attachment.

33. An apparatus for detecting and selectively removing viruses in messages transferred using an electronic mail system, the apparatus comprising:

means for detecting the presence of a message;

means for analyzing the message to determine whether data associated with the message contains a virus.

34. The apparatus of claim 33, further comprising:

means for obtaining a copy of the data associated with the mail message.

35. The apparatus of claim 34, further comprising:

means for treating the message when the message is determined to contain a virus.

36. The apparatus of claim 35, wherein the message is intended for access by a first node; the means for detecting the presence of a message resides at the first node; and the message that is detected resides at a second node.

37. The apparatus of claim 36, wherein the second node is a postal node in the electronic mail system.

38. The apparatus of claim 37, wherein the means for treating the message comprises:

means for replacing an attachment at the postal node with a cleaned attachment, the attachment corresponding to the message.

39. The apparatus of claim 33, wherein the means for detecting the presence of a message comprises means for accessing a mailbox file.

40. The apparatus of claim 39, wherein the means for detecting the presence of a message emulates the polling routines used by the electronic mail system.

41. The apparatus of claim 36, wherein the message comprises a unique message identifier, a header, and at least one attachment.

42. The apparatus of claim 41, further comprising:

means for recording the unique message identifier in a data buffer to log whether the message has been analyzed.

* * * * *

UNITED STATES PATENT AND TRADEMARK OFFICE
CERTIFICATE OF CORRECTION

PATENT NO.    : 5,889,943
DATED         : March 30, 1999
INVENTOR(S)   : Ji et al.

It is certified that error appears in the above-identified patent and that said Letters Patent is hereby corrected as shown below:

<u>Column 21, line 29 - Column 24, line 37,</u>
Please replace the claims with the following claims:

1.    An apparatus for detecting and selectively removing viruses in electronic mail systems where data is accessed from a postal node to a second node, the second node including a bus, the postal node in communication with the second node, the apparatus comprising:
a polling module, coupled to the bus, in communication with the postal node, for detecting the presence of a message at the postal node;
a retrieval module, coupled to the bus, in communication with the postal node, for obtaining a copy of data associated with the message;
a virus analyzing module, coupled to the bus, in communication with the retrieval module, for determining whether the data associated with the message contains a virus; and
a mail scanning manager, coupled to the bus, in communication with the polling module, the retrieval module and the virus analyzing module, for controlling the polling module, the retrieval module and the virus analyzing module.
    2.    The apparatus of claim 1, further comprising:
a virus treatment module, coupled to the bus, in communication with the virus analyzing module and the mail scanning manager, for correcting messages found to contain a virus.
    3.    The apparatus of claim 1, further comprising:
a data buffer, coupled to the bus, in communication with the retrieval module and the mail scanning manager, for keeping a record of the data associated with the message.
    4.    The apparatus of claim 3, wherein the data buffer includes a first field uniquely identifying the message and a second field indicating whether the message has been analyzed.
    5.    The apparatus of claim 2, further comprising:
a decoder, coupled to the bus, in communication with the virus analyzing module, the virus treatment module and the mail scanning manager, for decoding messages for analysis and treatment.
    6.    The apparatus of claim 1, further comprising a mail sending module, coupled to the bus, in communication with the mail scanning manager, for sending mail messages using the electronic mail system.
    7.    The apparatus of claim 1, wherein the message comprises a unique identification number and a header.
    8.    The apparatus of claim 7, wherein the message further comprises at least one attachment.
    9.    A method for detecting and selectively removing viruses in messages accessed from a first node in an electronic mail system by a second node, the method comprising the steps of:
polling the first node from the second node to determine a presence of a message for the second node at the first node;
retrieving to the second node from the first node data associated with the message;
analyzing the message to determine whether the message contains a virus.
    10.    The method of claim 9, wherein the message comprises a unique identification number and a header.
    11.    The method of claim 10, wherein the message further comprises at least one attachment.
    12.    The method of claim 9, further comprising the step of treating the message when the message is determined to contain a virus.
    13.    The method of claim 9, further comprising the step of recording data associated with the message to log whether the message has been analyzed.
    14.    The method of claim 13, wherein the step of treating the message includes removing the virus from the message.

UNITED STATES PATENT AND TRADEMARK OFFICE
CERTIFICATE OF CORRECTION

PATENT NO.   : 5,889,943
DATED        : March 30, 1999
INVENTOR(S)  : Ji et al.

It is certified that error appears in the above-identified patent and that said Letters Patent is hereby corrected as shown below:

<u>Column 21, line 29 - Column 24, line 37 (cont'd),</u>

15. The method of claim 13, wherein the step of analyzing the message further comprises the steps of:
storing the message in a temporary file:
scanning the temporary file for viruses; and
testing whether the scanning step detected a virus.

16. The method of claim 9, wherein the step of retrieving to the second node includes accessing the message and downloading the message into a memory at the second node.

17. The method of claim 9, further comprising sending a mail message to a party to indicate the detection of a virus.

18. The method of claim 12, wherein the step of treating the message includes replacing the attachment at the first node.

19. An apparatus for detecting and selectively removing viruses in messages accessed from a first node in an electronic mail system to a second node, the apparatus comprising:
means for polling the first node from the second node to determine the presence of a message for the second node at the first node;
means for retrieving to the second node from the first node data associated with the message; and
means for analyzing the message to determine whether the message contains a virus.

20. The apparatus of claim 19, further comprising means for treating the message when the message is determined to contain a virus.

21. The apparatus of claim 19, further comprising means for recording the data associated with the message to log whether the message has been analyzed.

22. The apparatus of claim 21, wherein the means for treating the message includes means for removing the virus from the message.

23. The apparatus of claim 21, wherein the means for analyzing the message further comprises:
means for storing the message in a temporary file;
means for scanning the temporary file for viruses; and
means for testing whether the scanning step detected a virus.

24. The apparatus of claim 19, further comprising means for sending a mail message to a party to indicate the detection of a virus.

25. The method of claim 20, wherein the step of treating the message includes replacing the attachment at the first node.

26. The apparatus of claim 19, wherein the means for retrieving accesses the message and downloads the message into a memory at the second node.

UNITED STATES PATENT AND TRADEMARK OFFICE
CERTIFICATE OF CORRECTION

PATENT NO. : 5,889,943
DATED : March 30, 1999
INVENTOR(S) : Ji et al.

It is certified that error appears in the above-identified patent and that said Letters Patent is hereby corrected as shown below:

Column 21, line 29 - Column 24, line 37 (cont'd),

27. The apparatus of claim 19, wherein the message comprises a unique identification number and a header.

28. The apparatus of claim 27, wherein the message further comprises at least one attachment.

Signed and Sealed this

Twenty-ninth Day of November, 2005

JON W. DUDAS
*Director of the United States Patent and Trademark Office*

(12) EX PARTE REEXAMINATION CERTIFICATE (8474th)
United States Patent
Ji et al.

(10) Number: US 5,889,943 C1
(45) Certificate Issued: Aug. 23, 2011

(54) ELECTRONIC MAIL VIRUS DETECTION AND ELIMINATION

(75) Inventors: Shuang Ji, Foster City, CA (US); Eva Chen, Cupertino, CA (US); Yung-Chang Liang, Cupertino, CA (US); Warren Tsai, Taipei (TW)

(73) Assignee: Trend Micro, Incorporated, Taipei (TW)

Reexamination Request:
No. 90/011,104, Jul. 20, 2010

Reexamination Certificate for:
Patent No.: 5,889,943
Issued: Mar. 30, 1999
Appl. No.: 08/625,800
Filed: Mar. 29, 1996

Certificate of Correction issued Nov. 29, 2005.

Related U.S. Application Data

(63) Continuation-in-part of application No. 08/533,706, filed on Sep. 26, 1995, now Pat. No. 5,623,600.

(51) Int. Cl.
*G06F 1/00* (2006.01)
*G06F 21/00* (2006.01)
*H04L 12/58* (2006.01)
*H04L 29/06* (2006.01)

(52) U.S. Cl. .......................................... 726/22; 713/188
(58) Field of Classification Search ............. 395/187.01
See application file for complete search history.

(56) References Cited

U.S. PATENT DOCUMENTS

| | | | |
|---|---|---|---|
| 4,621,321 A | 11/1986 | Boebert et al. |
| 4,701,840 A | 10/1987 | Boebert et al. |
| 4,713,753 A | 12/1987 | Boebert et al. |
| 5,276,735 A | 1/1994 | Boebert et al. |
| 5,278,901 A | 1/1994 | Shieh et al. |
| 5,367,682 A | 11/1994 | Chang |
| 5,398,196 A | 3/1995 | Chambers |
| 5,452,442 A | 9/1995 | Kephart |
| 5,499,297 A | 3/1996 | Boebert |
| 5,502,766 A | 3/1996 | Boebert et al. |
| 5,586,260 A | 12/1996 | Hu |
| 5,623,601 A | 4/1997 | Vu |
| 5,632,011 A | 5/1997 | Landfield et al. |
| 5,649,095 A | 7/1997 | Cozza |
| 5,864,683 A | 1/1999 | Boebert et al. |
| 5,956,486 A | 9/1999 | Hickman |

FOREIGN PATENT DOCUMENTS

| | | |
|---|---|---|
| EP | 0 666 671 | 8/1995 |
| EP | 0 666 671 A1 | 8/1995 |
| JP | A 3-76452 | 4/1991 |
| JP | A 6-110718 | 4/1994 |
| JP | A 7-95323 | 4/1995 |
| JP | A 9-504395 | 4/1997 |
| WO | WO 95/12162 | 5/1995 |

OTHER PUBLICATIONS

Sikorovsky, "Norman Data Offers Internet Firewall," Federal Computer Week, p. 41 (Jan. 23, 1995).
Burchell, "NetShield 1.5," Virus Bulletin, pp. 21–23 (Aug. 1994).
"Virus: Prevention, Detection, Recovery," Virus Bulletin, pp. 23–24 (Jul. 1994).

(Continued)

*Primary Examiner*—Minh Dieu Nguyen

(57) ABSTRACT

The detection and elimination of viruses on a computer network is disclosed. An apparatus for detecting and eliminating viruses which may be introduced by messages sent through a postal node of a network electronic mail system includes polling and retrieval modules in communication with the postal node to determine the presence of unscanned messages and to download data associated with them to a node for treatment by a virus analysis and treatment module. A method for detecting and eliminating viruses introduced by an electronic mail system includes polling the postal node for unscanned messages, downloading the messages into a memory of a node, and performing virus detection and analysis at the node.

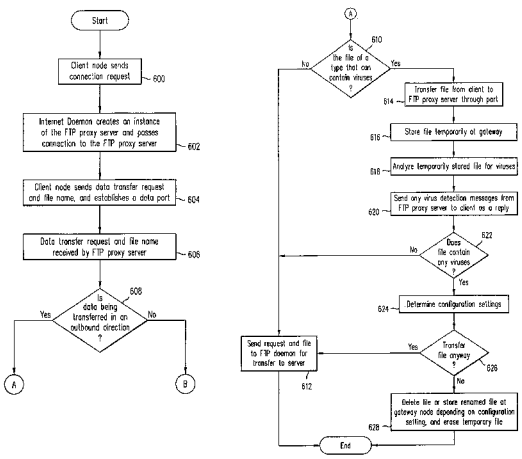

OTHER PUBLICATIONS

Burchell, "Net–Prot: F–Prot for Netware," Virus Bulletin, pp. 18–20 (Jun. 1994).
Burchell, "AVTK for NetWare," Virus Bulletin, pp. 20–22 (May 1994).
"IVPC '94—Alive and Well in the USA," Virus Bulletin, 1 page (May 1994).
Jackson, "Virus–Anti–Virus," Virus Bulletin, p. 16 (Apr. 1994).
Burchell, "CPAV for NetWare," Bulletin, pp. 18–20 (Mar. 1994).
Grebert, "Networking: Anti–Virus NLMs," Virus Bulletin, pp. 14–15 (Dec. 1992).
Ford and Layfield, "NLM Survey: Virus Protection Under NetWare," Virus Bulletin, pp. 15–19 (Dec. 1992).
Hruska and Jacobs, "Novell Experiments: Virus Propagation and NetWare Security," Virus Bulletin, pp. 10–18 (Aug. 1991).
Burchill, "Intel LANDesk Virus Protect," Virus Bulletin, pp. 17–19 (Apr. 1994).
Kephart, et al., "Fighting Computer Viruses," Scientific American, online at http://www.sciam.com/1197issue/1197/kephart.html, 8 pages (Nov. 1997).
"Norman Data's Firewall for Internet," Newsbytes, 1 page (published online Mar. 24, 1995).
The Norman Firewall User and Administration/Maintenance Guides, 25 pages (Norman Data Defense, Inc., Fairfax, Virginia) (Apr. 1995).
Avolio and Ranum, "The Internet Firewall Toolkit Experiences and Lessons Learned," Trusted Information Systems, Inc., PowerPoint Presentation, 10 pages (Jun. 3, 1994).
Avolio, "Panel on Security Issues for Mosaic and the World Wide Web," Proceedings of the Symposium on Network and Distributed System Security, 5 pages (San Diego, California) (Feb. 16–17, 1995).
Burchell, "Norton on Netware," Virus Bulletin, pp. 20–22 (Jul. 1994).
Three Various News Clippings re Integralis, 1 page (Jun. 1995).
Two Various News Clippings re Integralis / MIMESweeper, 5 pages (Jun. 1995).
Bell, et al., "End Post–Viral Depression," Personal Computer Magazine, 12 pages (Sep. 1993).
Exhibit 625—"10 Good Reasons Why You Should Consider Trend Micro Next Time You're Evaluating Your Virus Protection," (published online at http://www.antivirus.com/thefacts.htm), 6 pages (Oct. 1997).
"This 'Wall' Has Ears," PC Week, 21 pages (Aug. 5, 1996).
"This 'Wall' Has Ears," PC Week, 29 pages (Aug. 5, 1996).
Kurzban, "Viruses and Worms—What Can You Do?", International Business Machines Corporation, Systems Research Educational Center, 18 pages (Thornwood, New York) (1984).
"How We Tested Network Virus Protection," InfoWorld, 5 pages (Feb. 13, 1995).
Mike Avery, LANDesk 2.0 adopts DMI to control PC costs, InfoWorld (May 22, 1995).
William R. Cheswick & Steven B. Bellovin, Firewalls and Internet Security, AddisonWesley (Sep. 21, 1994).
Digital Electronics Corp., MAILbus Postmaster for LANs/WANs v3.0, Digital Electronics Corp. (Jun. 1993).
Michael S. Hines, Re: virus checking utilities, available at http://www.netsys.com/firewalls/firewalls.9405/msg00334.html, (May 27, 1994).

Intel Corp., Intel and Novell Sign Site Licensing Agreement for Intel's LANProtect Network Virus Protection Software (Apr. 28, 1992).
Vikrant Kothari & Tom Swiss, The Norman Firewall White Paper, Norman Development USA (1995).
Matt Kramer, Intel's LANDesk provides solid management base, PC Week (Jan. 11, 1993).
Reggie Lisle, Intel Corp. LANDesk, LAN Times (Jul. 24, 1995).
Norman Data Defense, Inc., The Norman Firewall User and Administration/Maintenance Guides, Norman Data Defense, Inc. (Apr. 1995).
Peter V. Radatti, Technical White Paper: Heterogeneous Computer Viruses in a Networked Unix Environment (Sep. 1992).
Salvatore Salamone, A Magic Bullet for Network Viruses, Data Communications (Dec. 1992).
Saydjari et al., LOCK Treck: Navigating Uncharted Space (1989).
Trusted Information Systems, Inc., Internet Firewalls: An Overview (Dec. 13, 1994).
Recovering from a Computer Virus Attack (1987).
Data Physician—A Virus Protection Program (1987).
Computer Under Attack: Intruders, Worms, and Viruses (Apr. 1988).
The Internet Worm Program: An Analysis (Nov. 29, 1988).
A Fault Tolerance Approach to Computer Viruses (1988).
Datamation, The Virus Cure (Feb. 15, 1989).
Computer Virology and Aids, ICCST (Oct. 3–5, 1989).
Viruses and Worms—What Can You Do? (1989).
Defending Systems Against Viruses through Cryptographic Authentication (1989).
A Proposal for a Verification–Based Virus Filter (1989).
Computers Under Attack: Intruders, Worms, and Viruses—Chapter 21 (1989).
Computer Viruses, Worms, Data Diddlers, Killer Programs and Other Threats to Your System—What They Are, How They Work, and How to Defend Your PC, Mac or Mainframe (1989).
Networking: Hyperaccess/5 Update Includes Virus Detection (Apr. 30, 1990).
IBM virus–busters take lead in preventing internal threats (Apr. 29, 1991).
The Internet Worm Incident, Technical Report CSD–TR–9 (Sep. 19, 1991).
Employment of Virus Detection Procedures at Domain Boundaries (Dec. 1991).
Concepts of an Expert System for Virus Detection (1991).
Article from Network World: Users thwart latest virus, look ahead (Mar. 9, 1992).
Article from Local Networking: Firm's LAN tools gain anti-virus safety net (Mar. 16, 1992).
Article from Virus Bulletin Conference: Detecting Viruses in the NetWare Environment (Sep. 1992).
Defense–in–Depth Against Computer Viruses (1992).
Rigney, S., Inoculating your LAN; Software Review; Central Point Software Inc.,'s Central Point Anti–Virus, Intel Corp. Personal Computer Enhancement Operation's LAN-Protect I.S; Evaluation Computer Shopper (Jun. 1993).
Proxy–Based Authorization and Accounting for Distributed Systems, Distributed Computing Systems, IEEE Conf. (1993).
Book: Survivor's Guide to Computer Viruses (1993).
Virus Bulletin (Jun. 1994).

Article from Software Roundup Reviews: Virus–Prevention NLMs (Aug. 1994).
Book: A Short Course on Computer Viruses, Second Ed. (1994).
InfoWorld, How We Tested Network Virus Protection (Feb. 13, 1995).
InfoWorld, Network virus protection: An ounce of prevention (Feb. 13, 1995).
Unix Expo Trade Shows: Computer Virus Awareness for UNIX, from NCSA News (May/Jun. 1992).
Peter V. Radatti, Computer Viruses In Unix Networks (Aug. 1995).
LANProtect by Intel Corp. (Feb. 26, 1992).
LANs Get Cure for Viral Infection (Mar. 2, 1992).
Intel LANProtect 1.5 Software Offers Enhanced Network Virus Protection (Jun. 18, 1992).
Intel LANDesk provides solid management base (Jan. 11, 1993).
Intel's LANDesk Software Hits the Streets (Mar. 22, 1993).
Product Information. LANDesk Virus Protect v2.0 by Intel Corporation (Sep. 9, 1993).
Trend Micro Devices provides hardware–based security solution; Trend Micro Devices Inc.'s StationLock data security card; Hardware Review; Network Edition; Evaluation (Nov. 9, 1993).
Intel LANDesk Manager Installation Checklist (Sep. 1994).
Intel LANDesk Manager Central control for managing networked PCs (Oct. 4, 1994).
Intel LANDesk Server Monitor Module Installation and User's Guide (1994).
Intel LANDesk Management Suite Tools Guide (1994).
Intel LANDesk Management Suite Scripting Guide (1994).
Intel's LANDesk Manager gains metering capabilities (Jan. 23, 1995).
Intel Enhances LANDesk (Feb. 20, 1995).
Intel's LANDesk 2.0: Strong net management, but plenty of bugs (Feb. 27, 1995).
LANDesk 2.0 tools are strong but buggy (Mar. 6, 1995).
Product Information, LANDesk Virus Protect v3.0 by Intel Corporation (May 26, 1995).
Intel LANDesk Management Suite v2.5 Reviewer's Guide (1995).
Intel LANDesk Virus Protect User's Guide (1995).
Arnold et al., Employment of Virus Detection Procedures at Domain Boundaries, IBM, Technical Disclosure Bulletin (Dec. 1991).
The Norton Desktop for Windows Version 2.0, Gateway 200 Edition (1991–92).
Intel's LANProject Detects 850 Viruses over NetWare LANs (Feb. 1992).
Intel Joins the Network Virus Hunt with LANProject (Jun. 16, 1992).
Chip away at viruses; how to fight local area network virus attacks with a microchip (Oct. 1992).
Windows 3.1 Secrets—Viruscan and Clean–Up (1992).
Product Review 1, Intel LANDesk Virus Protect (Apr. 1994).
The Internet has become a safe place to do business; Sidewinder (TM) protects information assets from the ravages of the Internet; Security That Strikes Back (TM) (Oct. 10, 1994).
Rodriguez, Karen, Sidewinder provides ironclad security Firewall system used by military, InfoWorld (Oct. 10, 1994).
Virus: Largest Notebook Manufacturer in Taiwan Bundles Trend Micro Devices' Mobile Protect; File Transfer Utility with Virus Protection Feature (Oct. 24, 1994).
U.S. Navy, Security Concept of Operations for the Standard Mail Guard (Draft) (Feb. 24, 1995).
Norman Data Defense Systems Unveils the Norman Firewall; Provides Secure Data Passage for Network–to–Internet Communications (Mar. 21, 1995).
UK: New Logic Bomb Threat to E–mail (Mar. 23, 1995).
TouchStone's FastMove a lean, inexpensive utility; Offers speed, virus detection, with minimal fanfare (May 1, 1995).
Executive Summary, Network Virus Destroyer (Pre–Draft 1.0) (Jun. 19, 1995).
Press Release, Integralis launches the Internet's first anti–virus protection system (Jun. 27, 1995).
Marketing brochure, MIMEsweeper the ultimate Email virus protection software (Jun. 20, 1995).
Integralis Launches the Internet's First Anti–virus Protection System (Jun. 30, 1995).
Research Notes Gauntlet 3.0: An Improved Firewall From TIS (Jul. 5, 1995).
Integralis Debuts Private' Internet Gateway Link, Virus Detection Software (Jul. 5, 1995).
Group GmbH WatchDog Version 2, Attachment–Checker for Lotus Notes (Aug. 6, 1995).
Norman Data Defense Systems Identifies, Prescribes Cures for Computer Viruses Onsite at FOSE '95.
Marketing Proposal for Norman Firewall: Automated Virus Analysis for the World (1994).
Norman Technical Plan—Anti–Virus Capability Development Plan for the Norman Firewall (Nov. 28, 1994).
The Norman Firewall—User Guide, Administration Guide, Maintenance Guide (1994–1995).
The Norman Firewall—Trusted Internetworking Superior Security (1995).
Outstanding Requirements for Norman Firewall One (Jan. 27, 1995).
Marketing letter from David J. Stang re Norman Data Defense Systems' Automatic Virus Analysis System (Mar. 6, 1995).
News article, Norman Data's Firewall for Internet (Mar. 24, 1995).
The Norman Firewall User Guide AV–Platform (Apr. 1995).
The Norman Firewall User and Administration/Maintenance Guides (Aug. 1995).
Preliminary Sidewinder Administration Guide (1995).
Sidewinder Administrative Guide Version 1.0 (1995).
Pamphlet TFS TransferFileSystem (1993).
Manual TFS Gateway 2.1, Electronic Mail Gateway, Internet Mail, made by TenFour (1995).
Three New Firewall Proxies from TIS (Sep. 29, 1994).
TIS Firewall Toolkit V1.3 available (Nov. 4, 1994).
Firewall Toolkit from TIS (Feb. 16, 1995).
Dr. Solomon's PC Anti–Virus Book 1994).
Online article from The Independent entitled "Computer experts fear potential of new virus," dated Aug. 28, 1995.
Factiva article entitled "Integralis debuts private' internet gateway link, virus detection software," dated Jul. 5, 1995.
Article entitled "Integralis debuts private' internet gateway link, virus detection software," dated Jul. 5, 1995.
MIMEsweeper product information article entitled "Integralis launches the Internet's first anti–virus protection system," dated 1995.

Online article entitled INTEGRALIS: Integralis announces MIMEsweeper for use with Lotus cc:mail, dated Sep. 7, 1995.

Online article entitled INTEGRALIS: Product Sidewire . . . , dated Sep. 8, 1995.

VirusGuard, Memory–Resident Virus Alert, A new addition to Dr Solomon's Antivirus Toolkit, copyright 1985–1991.

Dr. Solomon's Anti–Virus Toolkit, Version 4, copyright 1990.

Trusted Information Systems' Internet Firewall Toolkit—An Overview Presentation (1993).

Boyle, Buyer's Guide: Virus Scanning Tools, PC Magazine (Nov. 21, 1995).

Intel Corp., Intel LANDesk Management Suite v2.5 A Closer Look (1996).

Byte Magazine, Steven Cobb, Internet Firewalls The Demand for good Internet firewalls is spurred by the growing number of intrusion incidents, McGraw–Hill (Oct. 1, 1995).

Trend Micro Devices, Viruses and the Internet (Nov. 1995).

Norman Data Defense, Inc., An Introduction to the Norman Firewall, Norman Data Defense, Inc. (Jun. 1995).

MIMEsweeper Administrator Guide (1995).

Norman Data Defense, Inc., An Introduction to the Norman Firewall, Norman Data Defense, Inc. (Nov. 1995).

The Norman Firewall Administration Guide, User Guide, Maintenance Guide, Version 2.0 (Mar. 1996).

Why VFIND, A Discussion Of The VFind Anti–Virus Software Package (May 1996).

Network Security and SunScreen SPF–100, Technical White Paper (May 1995).

"Firewall," William R. Cheswick et al., published by SOFT-BANK Corp., Apr. 30, 1995, pp. 86–88, 94–96.

The Design of a Secure Internet Gateway, by Bill Cheswick, USENIX Summer Conference Jun. 11–15, 1990.

Sidewinder™ V2.0", Frequently Asked Questions, Copyright 1995.

Sidewinder™, Administrator Guide, Copyright 1995, Secure Computing Corporation.

Product Summary for Sidewinder V2.0, Copyright 1995.

Special Report: Secure Computing Corporation And Network Security, published Dec. 1994, the LOCALNetter Newsletter, vol. 14, No. 12.

Comparative Review, published Oct. 1994, Virus Bulletin Ltd.

Software Product Description, Published INTEGRALIS, version 1.0, Jul. 1995.

TIS Firewall Toolkit Overview, published Jun. 30, 1994, by Trusted Information Systems, Inc. and USENIX Association, Proceedings of the Summer 1994 USENIX Conference, Jun. 6–10, 1994.

Constructing a High Assurance Mail Guard, by R. Smith, Copyright 1994, Secure Computing Corp.

Intel LANProtect Product Overview and Intel LANProtect Users Guide, copyright 1992, by Intel Corporation.

A Gateway to Internet Health and Happiness, by Robin Layland, published Sep. 21, 1994 in Data Communications, Internetworking Views.

MpScan—Email Security. Published by Cybersoft, Jan. 1994.

Intel LANDesk Manager User's Guide, 1992, 1993.

Intel LANDesk Virus Protect User's Guide, Intel Corporation, 1995.

Secure Connections To The Internet, by Dr. Brian Neale, Digital Equipment Co. Ltd., Oct. 1994.

Network Firewalls, by Steven M. Bellovin and William R. Cheswick, IEEE Communications Magazine 32.

Message Access Paradigms and Protocols, by Terry Gray, Aug. 28, 1995.

An HTTP–based Infrastructure for Mobile Agents, by Anselm Lingnau et al., Fachbereich Informatik (telematik, Johann Wolfgang Goethe–universital—1995).

"Post Office Protocol," by J.K. Reynolds, Network Working Group, Request for Comments 918, Oct. 1984.

US 5,889,943 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 is confirmed.

Claims 9-28 are cancelled.

New claims 29-36 are added and determined to be patentable.

29. *An apparatus for detecting and selectively removing viruses in electronic mail messages accessed from a first node in an electronic mail system to a second node, the apparatus comprising:*
   *means for polling the first node from the second node to determine the presence of a message for the second node at the first node, wherein the second node comprises a bus, and the means for polling is coupled to the bus;*
   *means, coupled to the bus, for retrieving to the second node from the first node data associated with the message;*
   *analysis and treatment means, coupled to the bus, for analyzing the message to determine whether the message contains a virus and for treating the message when the message is determined to contain a virus; and*
   *means, coupled to the bus, for sending a mail message to a party to indicate the detection of a virus.*

30. *The apparatus of claim 29, wherein the analysis and treatment means comprises means for removing the virus from the message.*

31. *The apparatus of claim 29, wherein the analysis and treatment means comprises means for treating an infected attachment to a message determined to contain a virus, wherein the means for treating replaces the infected attachment at the first node.*

32. *An apparatus for detecting and selectively removing viruses in electronic mail messages accessed from a first node in an electronic mail system to a second node, the apparatus comprising:*
   *a polling module in communication with the first node that detects the presence of a message at the first node, wherein the second node comprises a bus, and the polling module is coupled to the bus;*
   *a retrieval module, coupled to the bus and in communication with the first node, that retrieves to the second node from the first node data associated with the message;*
   *a virus analyzing and treatment module, coupled to the bus, that analyzes the message to determine whether the message contains a virus and treats the message when the message is determined to contain a virus; and*
   *a mail sending module, coupled to the bus, that sends a mail message to a party to indicate the detection of a virus.*

33. *The apparatus of claim 32, wherein the virus analyzing and treatment module removes the virus from the message when the message is determined to contain a virus.*

34. *The apparatus of claim 32, wherein the virus analyzing and treatment module treats an infected attachment to a message determined to contain a virus and replaces the infected attachment at the first node.*

35. *An apparatus for detecting and selectively removing viruses in electronic mail messages, comprising:*
   *a mail scanning module located at a client node, the client node in communication with a postal node in a electronic mail system, the mail scanning module comprising*
   *a polling module in communication with the postal node that detects the presence of an electronic mail message at the postal node;*
   *a retrieval module in communication with the postal node that retrieves to the client node from the postal node data associated with the electronic mail message;*
   *a virus analyzing and treatment module that analyzes the electronic mail message to determine whether the message contains a virus and treats the electronic mail message when it is determined to contain a virus; and*
   *a mail sending module tha sends a mail message to a party to indicate the detection of a virus.*

36. *The apparatus of claim 35, wherein the virus analyzing and treatment module treats an infected attachment to a message determined to contain a virus and replaces the infected attachment at the postal node.*

* * * * *